(12) United States Patent
Kumar et al.

(10) Patent No.: US 11,755,890 B2
(45) Date of Patent: Sep. 12, 2023

(54) LOCAL TRAINING OF NEURAL NETWORKS

(71) Applicant: Rain Neuromorphics Inc., San Francisco, CA (US)

(72) Inventors: Suhas Kumar, Mountain View, CA (US); Alexander Almela Conklin, San Jose, CA (US); Jack David Kendall, San Mateo, CA (US)

(73) Assignee: Rain Neuromorphics Inc., San Francisco, CA (US)

( * ) Notice: Subject to any disclaimer, the term of this patent is extended or adjusted under 35 U.S.C. 154(b) by 0 days.

(21) Appl. No.: 17/977,991

(22) Filed: Oct. 31, 2022

(65) Prior Publication Data

US 2023/0138695 A1 May 4, 2023

Related U.S. Application Data

(60) Provisional application No. 63/306,008, filed on Feb. 2, 2022, provisional application No. 63/274,423, filed on Nov. 1, 2021.

(51) Int. Cl.
*G06N 3/04* (2023.01)
*G06N 3/048* (2023.01)
*G06N 3/063* (2023.01)

(52) U.S. Cl.
CPC .............. *G06N 3/048* (2023.01); *G06N 3/063* (2013.01)

(58) Field of Classification Search
CPC .............................. G06N 3/0481; G06N 3/063
See application file for complete search history.

(56) References Cited

U.S. PATENT DOCUMENTS

2017/0017877 A1  1/2017  Kataeva
2018/0075338 A1  3/2018  Gokmen
(Continued)

OTHER PUBLICATIONS

Ackley et al., A Learning Algorithm for Boltzmann Machines, Cognitive Science 9, 1985, pp. 147-169.
(Continued)

*Primary Examiner* — Brent Johnston Hoover
(74) *Attorney, Agent, or Firm* — Van Pelt, Yi & James LLP

(57) ABSTRACT

A method for performing learning is described. A free inference is performed on a learning network for input signals. The input signals correspond to target output signals. The learning network includes inputs that receive the input signals, neurons, weights interconnecting the neurons, and outputs. The learning network is described by an energy for the free inference. The energy includes an interaction term corresponding to interactions consisting of neuron pair interactions. The free inference results in output signals. A first portion of the plurality of weights corresponding to data flow for the free inference. A biased inference is performed on the learning network by providing the input signals to the inputs and bias signals to the outputs. The bias signals are based on the target output signals and the output signals. The bias signals are fedback to the learning network through a second portion of the weights corresponding to a transpose of the first portion of the weights. At locations in the learning network, learning network equilibrium states are determined for the biased inference. The weights are updated based on the learning network equilibrium states.

20 Claims, 13 Drawing Sheets

(56) References Cited

U.S. PATENT DOCUMENTS

2019/0370655 A1    12/2019  Modha
2021/0081775 A1*    3/2021  Leobandung ............ G06N 3/04

OTHER PUBLICATIONS

Ambrogio et al., Equivalent-Accuracy Accelerated Neural-Network Training using Analogue Memory, Nature, vol. 558, Jun. 7, 2018, pp. 60-81.
Bai et al., Deep Equilibrium Models, 33rd Conference on Neural Information Processing Systems (NeurIPS 2019), Oct. 28, 2019, pp. 1-16.
Bai et al., Multiscale Deep Equilibrium Models, 34th Conference on Neural Information Processing Systems (NeurIPS 2020), pp. 1-13.
Cai et al., Power-Efficient Combinatorial Optimization using Intrinsic Noise in Memristor Hopfield Neural Networks, Nature Electronics, vol. 3, Jul. 2020, pp. 409-418.
Cramer et al., Surrogate Gradients for Analog Neuromorphic Computing, PNAS 2022 vol. 119 No. 4, pp. 1-9.
Dillavou et al., Laboratory Demonstration of Decentralized, Physics-Driven Learning, Phys. Rev. Applied, vol. 18, Issue 1, Jun. 22, 2022, pp. 1-11.
Ernoult et al., Updates of Equilibrium Prop Match Gradients of Backprop Through Time in an RNN with Static Input, Advances in Neural Information Processing Systems 32 (NeurIPS 2019), May 31, 2019, pp. 1-34.
Hinton et al., Boltzmann Machines: Constraint Satisfaction Networks that Learn, Cognitive Science 9, May 1984, 44 pages.
James C. Spall, Multivariate Stochastic Approximation Using a Simultaneous Perturbation Gradient Approximation, IEEE Transactions on Automatic Control, vol. 37, No. 3, Mar. 1992, pp. 332-341.
Kendall et al., Training End-to-End Analog Neural Networks with Equilibrium Propagation, Jun. 9, 2020, pp. 1-31.
Lee et al., Difference Target Propagation, in Machine Learning and Knowledge Discovery in Databases, Springer International Publishing, 2015, pp. 498-515.
Li et al., Efficient and Self-Adaptive in-situ Learning in Multilayer Memristor Neural Networks, Nature Communications, (2018) 9:2385, pp. 1-8.
Lim et al., Spontaneous Sparse Learning for PCM-Based Memristor Neural Networks, Nature Communications, (2021) 12:31, pp. 1-14.
Movellan, Contrastive Hebbian Learning in the Continuous Hopfield Model, Connectionist Models, Proceedings of the 1990 Summer School, 1991, pp. 10-17.
O'Connor et al., Training a Spiking Neural Network with Equilibrium Propagation, Proceedings of the Twenty-Second International Conference on Artificial Intelligence and Statistics, vol. 89, 2019, pp. 1-8.
Scellier et al., Equilibrium Propagation: Bridging the Gap between Energy-Based Models and Backpropagation, published May 4, 2017, vol. 11, Article 24.
Stern et al., Physical Learning Beyond the Quasistatic Limit, Phys. Rev. Research, vol. 4, Issue 2, Dec. 21, 2021, pp. 1-26.
Wang et al., In Situ Training of Feed-Forward and Recurrent Convolutional Memristor Networks, Nature Machine Intelligence, vol. 1, Sep. 2019, pp. 434-442.
Xiao et al., Training Feedback Spiking Neural Networks by Implicit Differentiation on the Equilibrium State, 35th Conference on Neural Information Processing Systems (NeurIPS 2021), pp. 1-13.
Xie et al., Equivalence of Backpropagation and Contrastive Hebbian Learning in a Layered Network, Neural Computation 15, 2003, pp. 441-454.
Zoppo et al., Equilibrium Propagation for Memristor-Based Recurrent Neural Networks, Front. Neurosci. 14:240, Mar. 2020, pp. 1-8.

* cited by examiner

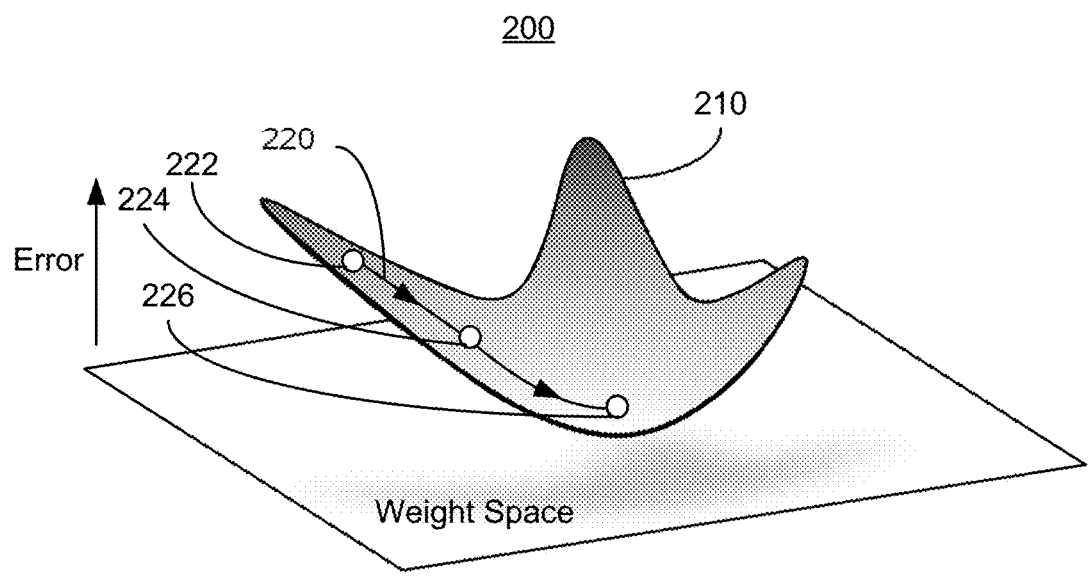
FIG. 2
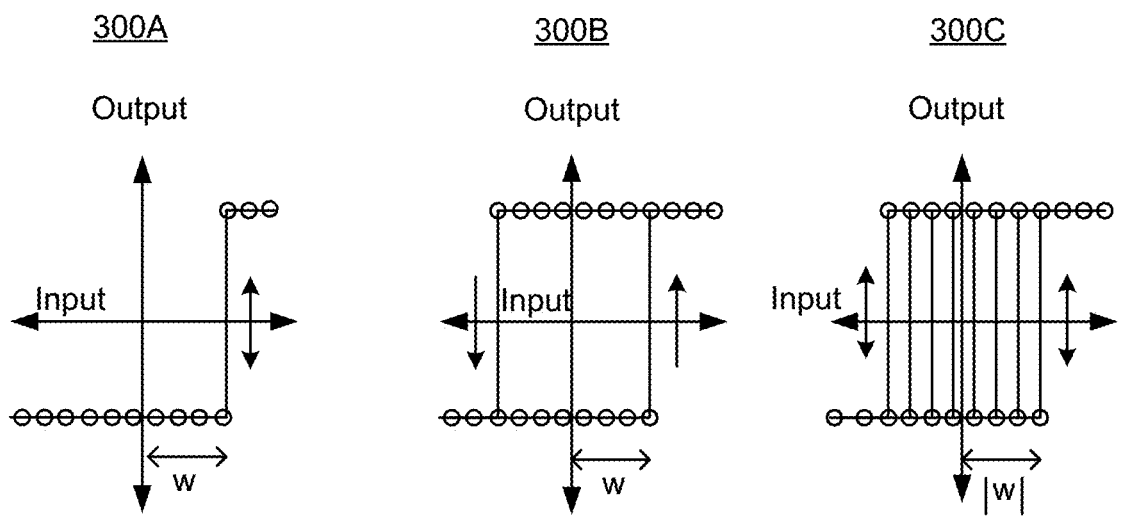
FIG. 3A  FIG. 3B  FIG. 3C

LOCAL TRAINING OF NEURAL NETWORKS

CROSS REFERENCE TO OTHER APPLICATIONS

This application claims priority to U.S. Provisional Patent Application No. 63/274,423 entitled ACTIVITY-DIFFERENCE-BASED TRAINING OF DEEP NEURAL NETWORKS filed Nov. 1, 2021, and U.S. Provisional Patent Application No. 63/306,008 entitled ACTIVITY-DIFFERENCE-BASED TRAINING OF DEEP NEURAL NETWORKS filed Feb. 2, 2022, both of which are incorporated herein by reference for all purposes.

BACKGROUND OF THE INVENTION

Artificial neural networks are learning networks loosely inspired by the brain. Such artificial neural networks include artificial synapses (that weight signals) and neurons (that process signals), often arranged in multiple 'deep' layers. Thus, an artificial neural network typically includes layers of neurons interleaved with layers of weights. The weights are generally implemented as programmable resistances. A weight layer provides weighted input signals to a neuron layer. Hardware neurons in the neuron layer combine weighted input signals using some function and provide output signals corresponding to the status of the neuron. The output signals from the neuron layer are provided as input signals to the next layer of weights. This process may be repeated for the layers of the network.

By reducing complex problems to a set of weights in the artificial neural network and leveraging hardware such as graphics processing units (GPUs) that can perform multi-weight operations in parallel, deep neural networks have dramatically improved the speed and efficiency with which data-heavy tasks can be accomplished. In order to perform data-heavy and other tasks, the artificial neural network is trained. Training involves determining an optimal (or near optimal) configuration of the high-dimensional and nonlinear weights space. For example, training may include evaluating the final output signals of the last layer of the artificial neural network based on a set of target outputs (e.g., the desired output signals) for a given set of input signals and adjusting the weights in one or more layers to improve the correlation between the output signals for the artificial neural network and the target outputs. Such training may be extremely energy inefficient and is projected to require a significant fraction of global energy production. Therefore, there is an urgent need for developing both models and hardware that offer significant energy efficiencies during training, which would enable the full societal and technological impact of artificial neural networks.

A common technique to train deep neural networks is back-propagation, which involves analytical calculations of errors at the output (last layer) and carrying of explicit error information through every layer backwards (in the form of required weight changes) to the input layer. In back-propagation, therefore, the gradient in the errors with respect to the weights is explicitly calculated for each layer and the weights in each layer adjusted accordingly. Despite original inspiration from biological neural networks, recent knowledge has shown back-propagation to be biologically implausible. Further, the gradients may be difficult or impossible to explicitly determine. Accordingly, what is desired is an improved technique for performing training in artificial neural networks.

BRIEF DESCRIPTION OF THE DRAWINGS

Various embodiments of the invention are disclosed in the following detailed description and the accompanying drawings.

FIG. 2 depicts an embodiment of the energy for the learning network.

FIGS. 3A-3E depict embodiments of thresholding functions for neurons in a learning network and the effect of thresholds on noise.

DETAILED DESCRIPTION

Figure 1:
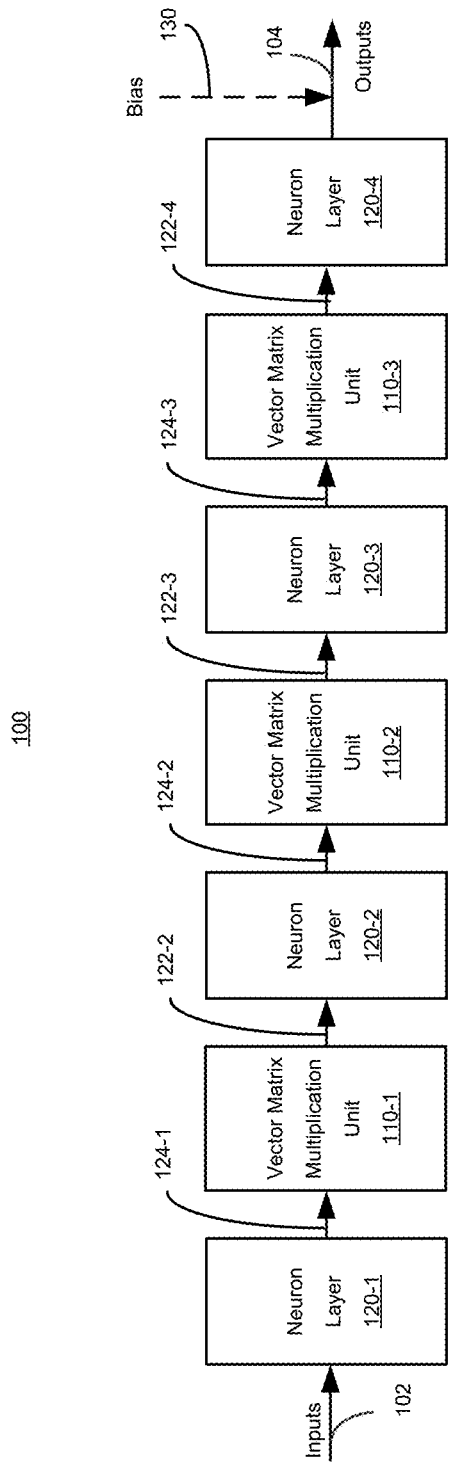
FIG. 1 depicts an embodiment of a learning network.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A method for performing learning is described. Using a learning network, a free inference is performed for input signals. The input signals correspond to target output signals. The learning network includes inputs that receive the input signals, weights, neurons, and outputs. The weights interconnect the neurons. The learning network is also described by an energy for the free inference. The energy includes an interaction term corresponding to interactions between the neurons. The interaction term consists of neuron pair interactions. The free inference results in output signals for the outputs. A first portion of the weights corresponds to data flow for the free inference. A biased inference is performed using the learning network by providing the input signals to the inputs and providing bias signals to the outputs. The bias signals are based on the target output signals and the output signals from the free inference. The bias signals are fedback to the learning network through a second portion of weights corresponding to a transpose of the first portion of the weights. At multiple locations in the learning network, learning network equilibrium states are determined for the for the biased inference. The weights are updated based on the learning network equilibrium states.

In some embodiments, the interaction term includes a quadratic portion. The quadratic portion is proportional to $-\Sigma_{i=1}^{N}\Sigma_{j=1}^{N}W_{ij}u_{i}u_{j}$, where $W_{ij}$ is a weight of the plurality of weights between neuron i of the plurality of neurons and neuron j of the plurality of neurons, $u_i$ is a neuron output signal of neuron i, $u_j$ is a neuron output signal of neuron j, and N is a total number of neurons.

The neurons may be arranged in neuron layers. The weights may be arranged in at least one weight layer. The weight layer(s) are interleaved with the neuron layers. In some embodiments, each of the neurons receives a neuron input signal and performs a thresholding function for the neuron input signal to provide a neuron output signal. The thresholding function may be a hysteretic thresholding function. In some embodiments, performing the free inference, providing the input signals and bias signals to perform the biased inference, determining the learning network equilibrium states, and updating the weights are iteratively performed. Performing the free inference, providing the input signals and bias signals to perform the biased inference, determining the learning network equilibrium states, and updating the plurality of weights may be iteratively performed such that the hysteretic thresholding function amplifies noise for a first portion of the iterations and suppresses noise for a second portion the iterations.

In some embodiments, the input signals are part of a plurality of split input signals. In such embodiments, the performing, providing, determining, and updating steps are also performed for a remaining portion of the split input signals. The method also includes concatenating final output signals for the plurality of split input signals.

A learning network is described. The learning network includes a vector matrix multiplication (vector MM) unit and a neuron layer. The vector MM unit is programmable and sparsely coupled. A first portion of the vector MM unit includes weights corresponding to a weight matrix. A second portion of the vector MM unit includes the weights and corresponds to a transpose of the weight matrix. The neuron layer includes inputs, outputs, and neurons coupled between the inputs and the outputs. The neuron layer is coupled with the vector MM unit such that the inputs receive weighted input signals from the first portion of the vector MM unit and such that the outputs provide neuron output signals to the second portion of the vector MM unit. The weights connect neuron pairs. The learning network is configured to receive input signals corresponding to target outputs, to provide learning network output signals in response to the input signals, to receive bias signals based on the target outputs and the learning network output signals, and to update the weights based on the bias signals, the target outputs, and the learning network output signals.

In some embodiments, the learning network is described by an energy including an interaction term corresponding to interactions between the neurons in the neuron layer. The interactions consist of neuron pair interactions. Thus, in some embodiments, the interaction term includes a quadratic portion only. The quadratic portion may be proportional to $-\Sigma_{i=1}^{N}\Sigma_{j=1}^{N}W_{ij}u_{i}u_{j}$, where $W_{ij}$ is a weight of the plurality of weights between neuron i of the plurality of neurons and neuron j, $u_i$ is a neuron output signal of neuron i, $u_j$ is a neuron output signal of neuron j, and N is a total number of neurons, the inference resulting in a plurality of output signals for the plurality of outputs.

In some embodiments, each of the neurons receives a weighted input signal and performs a thresholding function to provide a neuron output signal. The thresholding function may be a hysteretic thresholding function. In some embodiments, the hysteretic thresholding function amplifies noise for a first portion of a plurality of iterations and suppresses noise for a second portion the plurality of iterations.

The vector MM unit may include a sparsely coupled crossbar array. A first portion of the sparsely coupled crossbar array corresponds to the first portion of the vector MM unit, while a second portion of the sparsely coupled crossbar array corresponds to the second portion of the vector MM unit. In another embodiment, the vector MM unit may include a sparsely coupled crossbar array to which the neuron layer is coupled such that the inputs of the neuron layer receive the weighted input signals from a matrix configuration of the vector MM unit. The neuron layer is also coupled to the sparsely coupled crossbar array such that the neuron output signals are provided to the sparsely coupled crossbar array in a transposed matrix configuration. The vector MM unit may be expanded to have multiple first portions and multiple second portions corresponding to different weight matrices and their transposes. Each set of first and second portions correspond to a different neuron layer.

In some embodiments, the input signals are a portion of a number of split input signals. In such embodiments, the learning network further includes a splitter and a concatenation unit coupled with the vector MM unit. The splitter selects the input signals from the split input signals. The concatenation unit is also coupled with the neuron layer and combines the neuron output signals.

A learning network including system inputs, at least one vector matrix multiplication (MM) unit coupled with the learning network inputs, a plurality of neuron layers, and a plurality of system outputs, The system inputs are configured to receive input signals. The vector MM unit(s) are coupled with the system inputs. The vector MM unit(s) include a programmable and sparsely coupled crossbar array. Each of the vector MM unit(s) includes a first portion and a second portion The first portion includes weights corresponding to a weight matrix. The second portion includes weights corresponding to a transpose of the weight matrix. The at least one vector MM unit is interleaved and coupled with the neuron layers. Thus, the vector MM unit(s) may be coupled with the system input(s) directly or through one or more neuron layers. Each of the neuron layers includes inputs, outputs, and neurons coupled between the inputs and the outputs. Each of at least a portion of the neuron layers is coupled such that the inputs receive weighted signals from the first portion of a vector MM unit and such that the outputs provide neuron output signals to the second portion of the vector MM unit. In some embodiments, the inputs of the first neuron layer correspond to or are coupled to the system inputs. In some embodiments, the outputs of the last neuron layer correspond to or are coupled to the system outputs. Thus, the system outputs are coupled with a final neuron layer of the neuron layers. The system outputs are configured to provide output signals based on the input signals and to receive bias signals. The input signals correspond to target outputs. The bias signals are based on the target outputs and the output signals. The weights are configured to be updated based on the bias signals, the target outputs, and the output signals. In some embodiments, each of the neurons performs a thresholding function to provide a neuron output signal. In some such embodiments, the thresholding function includes a hysteretic thresholding function.

FIG. 1 depicts an embodiment of learning network 100. Learning network 100 may be an artificial neural network that may be trained via machine learning. Learning network 100 includes multiple neuron layers 120-1, 120-2, 120-3, and 120-4 (collectively or generically 120) of neurons that are interleaved with vector matrix multiplication (MM) units 110-1, 110-2, and 110-3 (collectively or generically 110). Learning network 100 also includes system inputs 102, system outputs 104, and bias 130. Also shown are inputs 102, 122-2, 122-3, and 122-4 (collectively or generically inputs 122) and outputs 124-1, 124-2, 124-3, and 104 (collectively or generically outputs 124) for each neuron layer 120. In the embodiment shown, the system inputs 102 are inputs for first neuron layer 120-1. Similarly, system outputs 104 are the outputs for the last neuron layer 120-4. System inputs 102, system outputs 104, bias 130, inputs 122, and outputs 124 are shown as single arrows. In general, however, multiple system inputs, multiple system outputs, multiple bias lines, multiple inputs for each neuron layer, and multiple outputs from each neuron layer are present. Moreover, the arrows illustrate information flow during a typical inference (discussed below). However, information may flow in both directions. For example, in a biased inference, information may flow in the reverse direction as well as in the forward direction. Although four neuron layers 120 and three vector MM units 110 are shown, another number of neuron layer(s) and/or another number of vector MM units may be used. For example, a learning network may include two neuron layers having a single vector MM unit between the layers. In another example, ten neuron layers interleaved with nine vector MM units may be used. Further, although system inputs 102 are shown as being connected provide to first neuron layer 120-1, in some embodiments, a vector MM unit (not shown) may be connected system inputs 102. In such embodiments, the inputs 122 to neuron layer 120-1 are the outputs of such a vector MM unit.

Vector MM units 110 may be considered to be analogous to synapses in a biological neural network. Each vector MM unit 110 includes programmable components, such as a memristors, nonvolatile memory cells, and/or other programmable resistors, for which the impedance (or resistance) can be adjusted. The impedances can be considered to be the programmable weights applied to signals by vector MM units 110. In some embodiments, the programmable components of vector MM units 110 are sparsely connected (not all weights connected to all of its neighbors). In other embodiments, the programmable components of vector MM units 110 may be fully connected (each weight or programmable components is connected to all of its neighbors). In some embodiments, the connections between programmable components of vector MM units 110 are programmable. Each of vector MM units 110 may be the same as or different from other vector MM units 110. For example, vector MM unit 110-2 may include a different number of input lines, outputs, and weights than vector MM unit 110-1. In another example, vector MM unit 110-2 may have the weights connected differently than vector MM unit 110-1 whether or not the vector MM units 110-1 and 110-2 have the same number of weights. The configuration of each vector MM unit 110 depends upon factors such as the number and configuration of neurons in the corresponding neuron layer 120. In some embodiments, a separate component is used to update the programmable components (i.e. weights) in vector MM units 110. In some embodiments, vector MM units 110 includes logic used to update the programmable components. In some embodiments, vector MM units 110 are crossbar arrays. A first portion of each vector MM unit 110 may be configured such that the weights (i.e. programmable components) correspond to a weight matrix. A second portion of each vector MM unit 110 includes the weights and corresponds to a transpose of the weight matrix. Thus, the first portion of each vector MM unit 110 may provide a vector matrix multiplication for the weights, corresponding to information flow in the forward direction for an inference (and biased inference). The second portion of each vector MM unit 110 may provide a vector matrix multiplication for the transpose of the weights, corresponding to information flow in the reverse direction for a biased inference.

Each neuron layer 120 includes inputs 122, outputs 124, and neurons (not explicitly depicted in FIG. 1) coupled between inputs 122 and the outputs 12.4. The neurons of neuron layer 120 receive weighted input signals from corresponding vector MM units 110, combine the weighted input signals based on function(s) for the neurons, and provide one or more resulting output signals on outputs 124. In some embodiments, neuron layers 120 are coupled with the previous vector MM unit 110 such that inputs 122 receive weighted input signals from the first portion of the previous vector MM unit 110 and such that outputs 124 provide neuron output signals to the second portion of vector MM unit 110. The weights in each vector MM unit 110 connect neuron pairs. Neuron layer 120-1 receives (unweighted) input signals via inputs 102 and combines the input signals based on a function of input signals. Neuron layers 120-1, 120-2 and 120-3 provide their output signals to another layer of vector MM units 110. Neuron layer 120.4 provides the output signals for learning network 100. In some embodiments, neuron layers 120 are the same. In other embodiments, neuron layer(s) 120 may differ from other neuron layer(s) 120. For example, different numbers of neurons may be present in different neuron layers 120. Similarly, the function(s) used by neurons in a neuron layer 120 to operate on input signals may be the same as or different from the function(s) used in other neuron layers. In some embodiments, function(s) used by neurons in each neuron layer 120 include or consist of a thresholding function, as discussed below. Stated differently, the state (and thus output signal) of a neuron may be determined based on whether the input signal meets or exceeds particular threshold(s). For example, a simple thresholding function may be such that if the input signal (e.g., a current) to a particular neuron is greater than a threshold, θ, then the neuron has an output of logical +1 (e.g. a voltage of +V or current of +I). If the input signal is less than the threshold, the neuron may have an output signal of −1 (e.g., a voltage of −V or current of −I).

Also shown in learning network 100 is bias 130. Bias 130 provides bias signals to system outputs 104. Bias 130 is indicated by a dashed line because the bias signals are selectively provided to system outputs 104. Stated differently, bias signals are only sometimes provided to system outputs 104. In some embodiments, this may include selectively coupling (or decoupling) bias 130 with system outputs 104.

Learning network 100 is configured to receive input signals corresponding to target outputs, to provide learning network output signals in response to the input signals, to receive bias signals based on the target outputs and the learning network output signals, and to update the weights based on the bias signals, the target outputs, and the learning network output signals. Learning network 100 is configured such that training can be accomplished without explicitly calculating gradients as required by back-propagation. More specifically, learning network 100 may be trained using activity-difference training.

Activity-difference training uses locally available information within the learning network to identify weight changes, without needing to explicitly calculate errors and propagate them across learning network 100. Activity-difference training is typically numerical and probabilistic in nature, and has strong recent evidence as being biologically plausible. Activity-difference training involves feeding learning network 100 training data as input signals to system inputs 102 in a "free" phase (in the absence of biasing provided by bias 130 to system outputs 104). Thus, a free inference may be considered to be performed. The input signals for the training data have corresponding target output signals (i.e. the desired output signals for the input signals). In another, bias phase, bias signals are provided to system outputs 104 via bias 130 such that system outputs 104 are closer or at the target output signals in response to the input signals being provided to system inputs 102. Thus, a biased inference may be considered to be performed. In some embodiments, system outputs 104 are nudged to be closer to the target output signals for the input signals provided to system inputs 102. In some embodiments, the bias signals clamp system outputs 104 at the target output signals during the bias phase. In some embodiments, the bias signal may be proportional to the desired target output. In other embodiments, the bias signal may be proportional to the error (the difference between the desired output and the free phase output). Thus, the bias signals provided via bias 130 may "nudge" or "clamp" output signals to be closer to or at the target output signals. The difference between the free and the bias phases encode the weight changes desired. For example, the desired weight changes may be determined by monitoring various portions of learning network 100 during the free and bias phases to determine the state of particular nodes of learning network. The weights in vector MM units 110 may be adjusted in accordance with the difference between the states during the free and bias phases. This process of carrying out the free phase, bias phase, and monitoring of the network may be iteratively implemented until equilibrium (or a state sufficiently close to equilibrium is reached).

Learning network 100 is configured such that it may be considered to be described by an "energy". A global minimum in the energy represents the ideal trained configuration. Thus, the term energy is intended to relate to training of learning network 100 rather than physical forms of energy (e.g., energy dissipated by learning network 100 in the form of heat). The energy may also be considered to describe the operation of neurons in neuron layers 120 as well as weights in vector MM units 110 on input signals that results in the corresponding output signals. The energy includes the function which the neurons in neuron layers 120 utilize to provide output signals (e.g., the state of the neuron) as well as the weights for vector MM units 110. Activity-difference training utilizes local information to approach or reach the global minimum in the energy. For example, FIG. 2 depicts an embodiment of the energy 210 in a space in which the horizontal plane corresponds to weights and the vertical axis corresponds to the error from the ideal trained configuration. A particular form of activity-difference training occurs along curve 220 in the surface formed by energy 210. Using activity-difference training, the state of learning network 100 may proceed from 222, to 224 and to at or near the global minimum at 226.

Referring back to FIG. 1, for learning network 100, the energy includes an interaction term that corresponds to interactions between the neurons in the neuron layers. The interactions consist of neuron pair interactions. Thus, in some embodiments, the interaction term includes a quadratic portion only. This interaction component may be an Ising component for pairs of neuron interacting via components of a weight matrix. The quadratic portion of the interaction component of the energy may be proportional to $-\Sigma_{i=1}^{N}\Sigma_{j=1}^{N}W_{ij}u_i u_j$, where $W_{ij}$ is a weight of vector MM unit 110 between neuron land neuron j, $u_i$ is a neuron output signal (or state) of neuron i in neuron layers 120, $u_j$ is a neuron output signal (or state) of neuron j in neuron layers 120, and N is a total number of neurons. In some embodiments, therefore, the energy, E, for learning network 100 is given by:

$$E = -\frac{1}{2}\sum_{i=1}^{N}\sum_{j=1}^{N}W_{ij}u_i u_j - \sum_{i=1}^{N}b_i u_i + \sum_{i=1}^{N}\theta_i u_i \qquad (1)$$

The energy could also be considered to take the form:

$$E = \sum_{i=1}^{N}\frac{1}{2}u_i^2 - \frac{1}{2}\sum_{i=1}^{N}\sum_{j=1}^{N}W_{ij}u_i u_j - \sum_{i=1}^{N}b_i u_i + \sum_{i=1}^{N}\theta_i u_i \qquad (2)$$

In the energy formulation of both equations (1) and (2), the Ising component represents the interaction between pairs of neuron (represented by their states $u_i$ and $u_j$), which interact via components of weight matrix W of vector MM units 110. Individual, neurons have a threshold θ and a bias b. Such energies can be accounted for by the functions for individual neurons. The first term in equation (2) represents a status of a single neuron independent of interactions with other neurons. The linear terms in the energy may be accounted for in the configuration of the neurons. Consequently, the Ising component may be considered to be the energy of interest represented by energy 210 in FIG. 2.

The energies of equations (1) and (2) correspond to the free phase, or free inference. For the biased phase, an additional term corresponding to the neuron bias signal due to the bias signal provided via bias 130 is added. The bias term may be considered to have the form:

$$+\sum_{i=1}^{N}\frac{\beta}{2}(u_i - d_i)^2 \qquad (3)$$

In the bias phase, $d_i$ is the desired output signal of neuron i. In the embodiment described by equation 3, the bias term corresponds to the nudge applied via bias 130 and consists of a positive penalty to the energy for any deviation of the neuron's state $u_i$ from the desired output $d_i$. In another embodiment, the bias signal may also be proportional to $d_i$. Other functions of the desired output might be used for the bias signal in other embodiments. During the biased phase, the total energy is the sum of equations (1) and (3) (or equations (2) and (3)).

The neurons in the above formulation may be continuous or discrete. For continuous neurons, the output state, $u_i$, of neuron i is a continuous function of the input. For a discrete neuron, the state, $u_i$, of neuron i, is not continuous. Further, in some embodiments, the neuron utilizes a thresholding function.

Figure 3D:
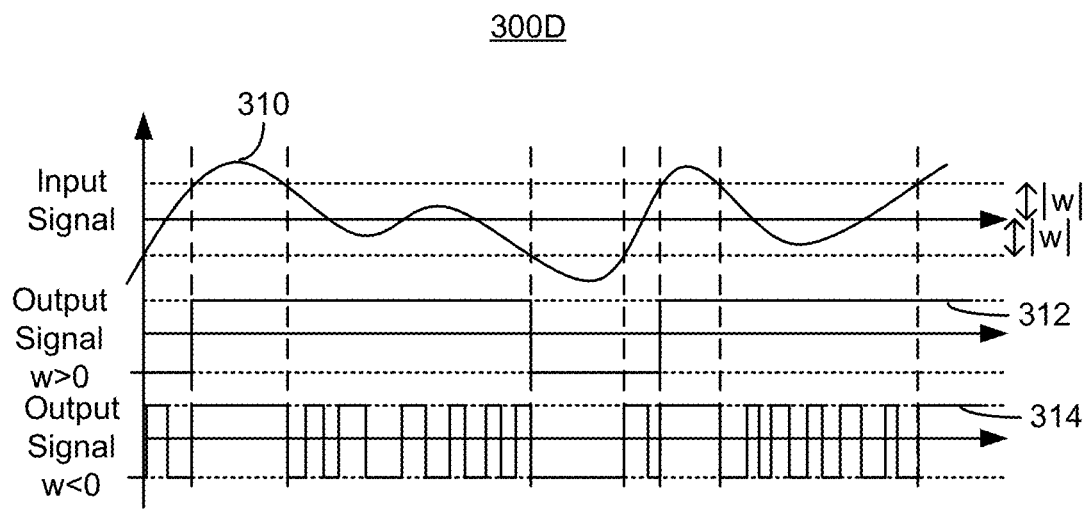
Figure 3E:
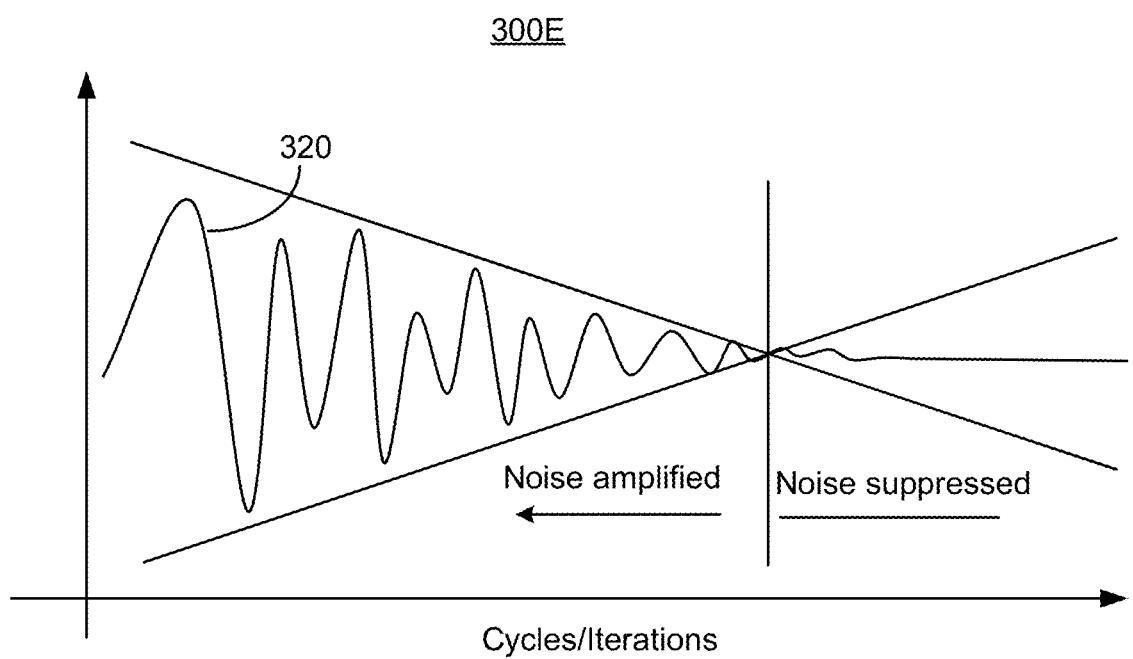

FIGS. 3A-3E depict thresholding functions and how they may operate in learning networks such as learning network 100. FIGS. 3A, 3B, and 3C depict embodiments thresholding functions 300A, 300B, and 300C, respectively, that may be used for neurons in learning network 100 or an analogous learning network. FIGS. 3D-3E indicate operation of the neurons using the thresholding functions. Referring to FIG. 3A, graph 300A depicts a simple thresholding function. When the neuron input signal is below the threshold (w), the neuron provides one output signal. When the neuron input signal is above the threshold, the neuron provides another output signal. The transition at the threshold is indicated by the dual-headed arrow crossing the input axis in FIG. 3A.

Referring to FIG. 3B, graph 300B depicts a hysteretic thresholding function with a threshold of +|w| (i.e. the threshold, w, is positive). When the neuron input signal is increasing and passes the threshold +w, the neuron output signal transitions from low to high. When the neuron input signal is decreasing and passes the threshold −w, the neuron output signal transitions from high to low. Such a thresholding function suppresses noise in learning network 100. These transitions are indicated by the arrows crossing the input axis in FIG. 3B. This can be understood by considering a neuron input signal near zero. If the neuron input signal increases or decreases slightly, the neuron output signal does not change. Thus, noise is suppressed.

In contrast, graph 300C depicts a hysteretic thresholding function which enhances noise. The hysteretic thresholding function has a threshold of −|w| (i.e. the threshold, w, is negative). When the neuron input signal is increasing and passes the threshold −|w|, the neuron output signal transitions from low to high. When the neuron input signal is decreasing and passes (i.e. becomes less than) the threshold +|w|, the neuron output signal transitions from high to low. Such a thresholding function enhances noise in learning network 100. This can be seen by considering a neuron input signal near zero. If the neuron input signal increases or decreases slightly, the neuron output signal transitions between the low and high output. Thus, fluctuations are enhanced and may be created if there are no other induced fluctuations.

The effect of noise for neurons having positive and negative thresholds is indicated in graph 300D of FIG. 3D. Input signal 310 crosses the threshold, ±|w|, at multiple times and exhibits noise. The neuron output signal 312 has a positive threshold (+|w|). More specifically, neuron output signal 312 transitions from low to high for input signal 310 increasing and passing threshold +|w|. Neuron output signal 312 transitions from high to low for input signal 310 decreasing and passing threshold −|w|. Neuron output signal 312 thus suppresses noise. The neuron output signal 314 has a negative threshold (−|w|). More specifically, neuron output signal 314 transitions between low and high multiple times for input signal 310 being between −|w| and +|w|. Neuron output signal 314 is stable only for input signal 310 being less that −|w| or greater than +|w|. Neuron output signal 314 thus enhances noise.

Hysteretic thresholding functions analogous to those of graphs 300B and 300C may improve performance of learning network 100 and/or analogous learning networks. Use of such thresholding functions can mitigate noise and improve training such that learning network 100 is more likely to settle at a global minimum in the energy. For example, early iterations, hysteretic functions having negative thresholds analogous to that shown in FIG. 3C may be used for neurons in neuron layers 110. As a result, fluctuations due to intrinsic noise are enhanced and activity-difference training of learning network may not become trapped in a local minimum of the energy. As the activity-difference training progresses, it is more likely that learning network 100 is approaching a global minimum. Thus, the neurons of neuron layer(s) 110 may be updated to use the hysteretic thresholding function having positive thresholds, analogous to that depicted in graph 300B. Consequently noise may be suppressed and learning network 100 may more rapidly approach the global minimum in the energy during activity-difference training. Such a case is indicated in FIG. 3E. Neuron input signal 322 has intrinsic noise, which is enhanced by utilizing thresholding function(s) have negative threshold(s) for neurons during starting iterations. Later, the thresholding functions are transitioned to positive threshold(s). This suppresses noise.

Thus, the term in the energy corresponding to interaction between the neurons for learning network 100 is the Ising term. As a result, vector MM units 110 may be configured as a simple crossbar array of programmable resistors. Such a crossbar array may be fully or sparsely coupled. The remaining terms are linear and can be implemented by manipulating the neuron function. Thus, the energy describing learning network 100 and for which activity-difference training is desired to be performed may be directly mapped to available hardware and allows for simplified implementation via clocking (discrete-time) and use of simple binary neuron functions. As a result, training of learning network 100 may be simplified and may utilize less power. Training may be further improved by selecting and updating the functions used by neurons in learning network 100 to first amplify, then later suppress noise. Thus, performance of learning networks such as learning network 100 may be improved. Further, such a learning network may be readily implemented, for example utilizing analog crossbars of multi-bit programmable memristive switches in vector MM units 110.

Other types of electronic switches such as flash memory, oxide-based memristors, phase change memories, ferroelectric memory, may also be used in some embodiments. Thus, a learning network 100 having improved performance and that is readily fabricated may be achieved.

Figure 4:
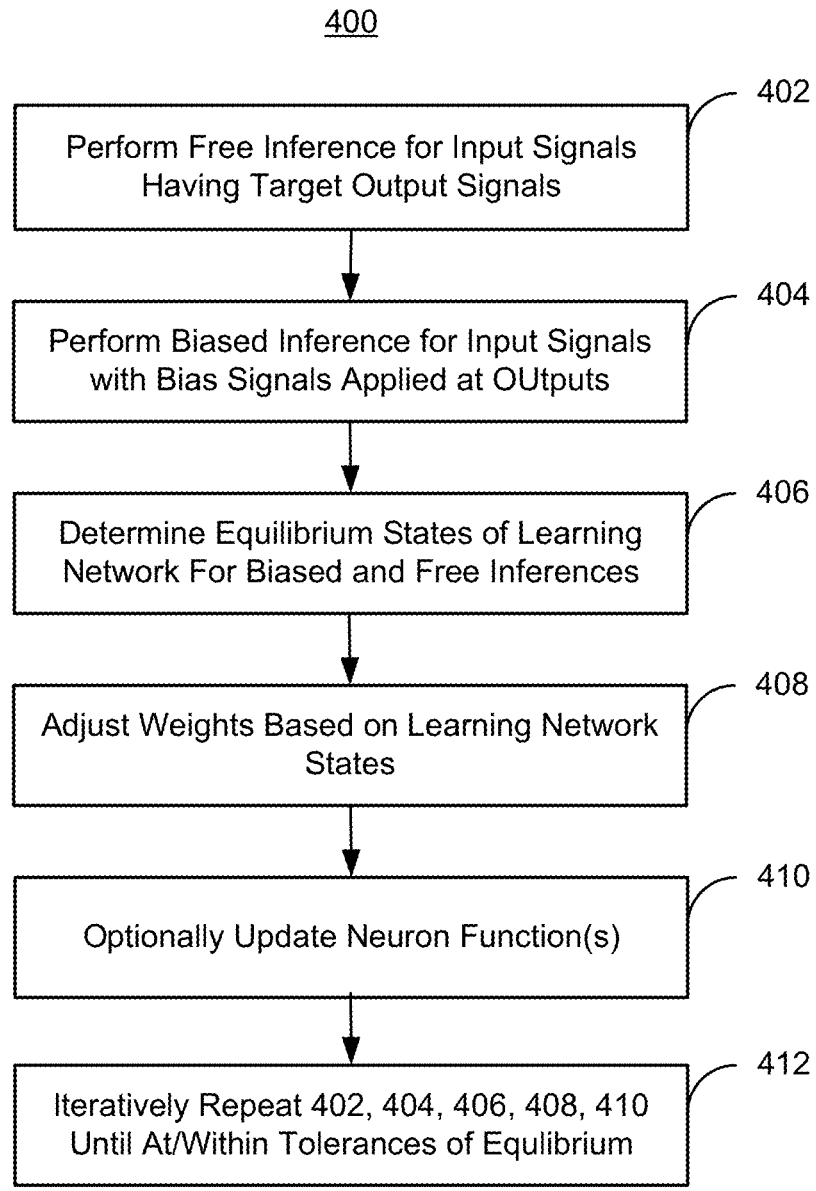
FIG. 4 depicts an embodiment of a method for performing activity-difference training on a learning network.

FIG. 4 depicts an embodiment of method 400 for performing activity-difference training on a learning network, such as learning network 100. Although particular steps are depicted, method 400 may include additional and/or other steps. Similarly, steps of method 400 may include substeps. Method 400 is described in the context of learning network 100. However, nothing prevents method 400 from being used in conjunction with other networks having an analogous energy function. For example, other learning networks including neurons (e.g., neurons that utilize thresholding functions) and/or vector MM units may be used.

A free inference is performed, at 402. To perform the free inference, input signals are provided to the system inputs of a learning network. Because these input signals are part of training data, target output signals correspond to the input signals. The learning network includes system inputs that receive the input signals, neurons, weights interconnecting the neurons, and system outputs that provide output signals. The learning network used for method 400 is also described by an energy analogous to that described above for learning network 100. For example, the interaction term consists of neuron pair interactions and is a quadratic term analogous described above. In some embodiments, neurons respond to inputs based on thresholding functions, such as hysteretic thresholding functions. A first portion of the weights in the learning network corresponds to data flow for the free inference. The free inference results in output signals provided at the system outputs. The outputs signals are a result of the functions performed by the neurons and the interactions between the neurons (e.g., the output signals are based on the energy). The output signals are typically different from the target outputs.

A biased inference is performed by the learning network, at 404. Performing the biased inference includes the same input signals being provided to the system inputs of the learning network and providing bias signals to the system outputs of the learning network. The bias signals are based on the target output signals and the output signals of the free inference. The bias signals nudge the output signals to be closer to (or clamp the output signals to be at) the target outputs. The bias signals are fedback to the learning network through a second portion of the weights in the learning network. The second portion of the weights corresponds to a transpose of the first portion of the weights.

At locations in the learning network, a learning network equilibrium states are determined for the biased inference and for the free inference, at 406. Although indicated as being performed after 402 and 404, 406 is performed in parallel with 402 and 404. Thus, the states at which locations in the learning network settle (i.e. equilibrium states for the locations) for the free inference are determined at 406 during or shortly after 402. Similarly, the equilibrium states at which the same locations settle for the for the biased inference are determined at 406 during or shortly after 404. Locations at which the equilibrium states are determined may include but may not be limited to the inputs to each neuron layer (i.e. the outputs of a corresponding weight layer) and/or the outputs from each neuron layer (i.e. the inputs to a next weight layer).

The weights are adjusted based on the learning network equilibrium states, at 408. The adjustment is based on the equilibrium states determined at 406. The update performed at 408 is thus based upon the target output signals, output signals, and input signals. In some embodiments, 402, 404, 406, and 408 may be considered to form one iteration, or epoch, for learning using method 400.

The functions utilized by the neurons in the learning network to provide their neuron output signals may be updated, at 410. For example, for a first iteration of method 400, the neurons may employ thresholding function(s) having a negative threshold(s) in order to amplify noise. At some subsequent iteration, the functions performed by the neurons may be changed to thresholding function(s) having positive threshold(s) to suppress noise.

In some embodiments, 402, 404, 406, 408, and 410 are iteratively repeated, at 412. Iterations may continue until a particular milestone is reached. For example, method 400 may terminate in response to the changes to the weights in 408 being at or below some threshold or some other measure of the learning network reaching an equilibrium status being achieved. In some embodiments, a measure of how close the output signals are to the target output signals may be used. In some embodiments, a specified number of iterations may be used to determine when to terminate the method. Thus, method 400 is repeated until it is determined via 412 that training is complete.

For example, if method 400 is used in connection with learning network 100, input signals are provided to system inputs 102 and a free inference performed. A biased inference is also performed at 404 by providing the input signals to system inputs 102 and providing the bias signals to system outputs 104 via bias 130. Equilibriums states at various locations in learning network are sampled for the free and biased inferences, at 406. For example, inputs 122-2, 122-3, and 122-4 to neuron layers 120 as well as outputs 124-1, 124-2, and 124-3 may be monitored during or after the free and biased inferences. At 408, weights in vector MM units 110 are adjusted based on the equilibrium states determined at 406, as well as based on the target output signals and the actual outputs signals on outputs 104. In order to determine the adjustment to the weights, a calculation may be performed as part of 408. The calculation takes into account the free and biased inference states. In some embodiments, the calculation utilizes a Hebbian-like contrastive rule. In other embodiments, other techniques may be used. The function(s) used by neurons in neuron layers 120 may optionally be updated, at 410. For example, the thresholding function may be changed from the noise enhancing function shown in graph 300C to the noise suppressing function shown in graph 300B. At 412, processes 402, 404, 406, 408, 410 may be iteratively repeated. Thus, learning network 100 may be trained via method 400.

Because activity-difference training is used, the training may be accomplished without requiring gradients to be explicitly calculated. Instead, training is probabilistic in nature. Further, training may be more efficiently accomplished. Because the thresholding function used for neurons in layers 120 may be updated (e.g., to less negative thresholds and/or from negative to positive thresholds), training may be completed more rapidly with less probability of learning network 100 being trapped in a local minimum of the energy instead of evolving toward the global minimum. Thus, training of a learning network may be more accomplished more rapidly and with less power consumed and may result in improved detection abilities of the learning network.

Figure 5:
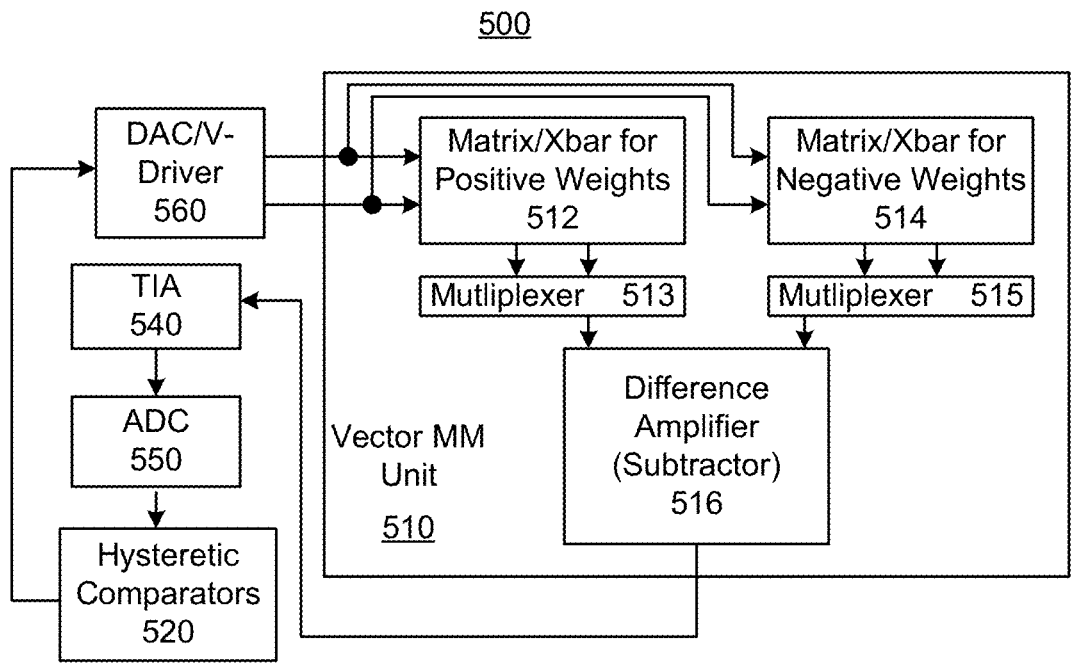
FIG. 5 depicts an embodiment of a learning network that may be trained using activity-difference training.

FIG. 5 depicts an embodiment of learning network 500 that is analogous to learning network 100. More specifically, learning network 500 may be described by an energy analogous to that described above with respect to learning network 100. For example, the interaction term for the energy may consist of neuron pair interactions. Thus, the interaction term for the energy of learning network 500 is a quadratic term. Neurons in learning network 500 may utilize thresholding functions, such as hysteretic thresholding functions. As such, learning network 500 may enhance and/or suppress noise as described in the context of graphs 300B-300E, learning network 100, and/or method 400. Learning network 500 may be an artificial neural network that may be trained using activity-difference training analogous to that described for method 400.

Learning network 500 includes vector MM unit 510 and hysteretic comparators 520 that are analogous to vector MM units 110 and neuron layers 120. Thus, learning network 500 may be viewed as one implementation of learning network 100. Although various lines in learning network 500 are depicted using single arrows, multiple conductive lines carrying multiple signals are typically present. Although a particular configuration is shown for learning network 500, other configurations may be possible.

Vector MM unit 510 includes two crossbar arrays 512 and 514, corresponding multiplexers 513 and 515, as well as difference amplifier 516. Crossbar arrays 512 and 514 utilize memristors and/or other programmable components for weights. In order to support both positive and negative weights in vector MM unit, two crossbar arrays 512 and 514 are used. Consequently, difference amplifier 516 may be used to subtract signals corresponding to negative weights (i.e. the input signals to vector MM unit 510 multiplied by the weights of crossbar array 514) from the signals corresponding to positive weights (i.e. the input signals to vector MM unit 510 multiplied by the weights of crossbar array 512). The neurons may be represented by components 520, 540, 550, and 560. Transimpedance amplifier (TIA) 540 converts signals represented as currents to voltage and may amplify the voltage signals as desired. Analog to digital converter (ADC) 550 converts the analog signals into digital format. Hysteretic comparators 520 perform the thresholding functions (e.g., using positive and/or negative thresholds). Hysteretic comparators 520 may also be programmed with the desired thresholding function. Thus, hysteretic comparators 520 may be considered to function as neurons. The output signals from hysteretic comparators 520 are converted into analog signals by digital to analog converter (DAC) 560 and used to drive system 510.

Thus, learning network 500 may be used for a single layer (e.g., a vector MM unit and corresponding neuron layer) or may be reprogrammed and used iteratively to represent multiple layers. Learning network 500 functions in an analogous manner to learning network 100. Consequently, learning network 500 may have analogous benefits to learning network 100.

Figure 6:
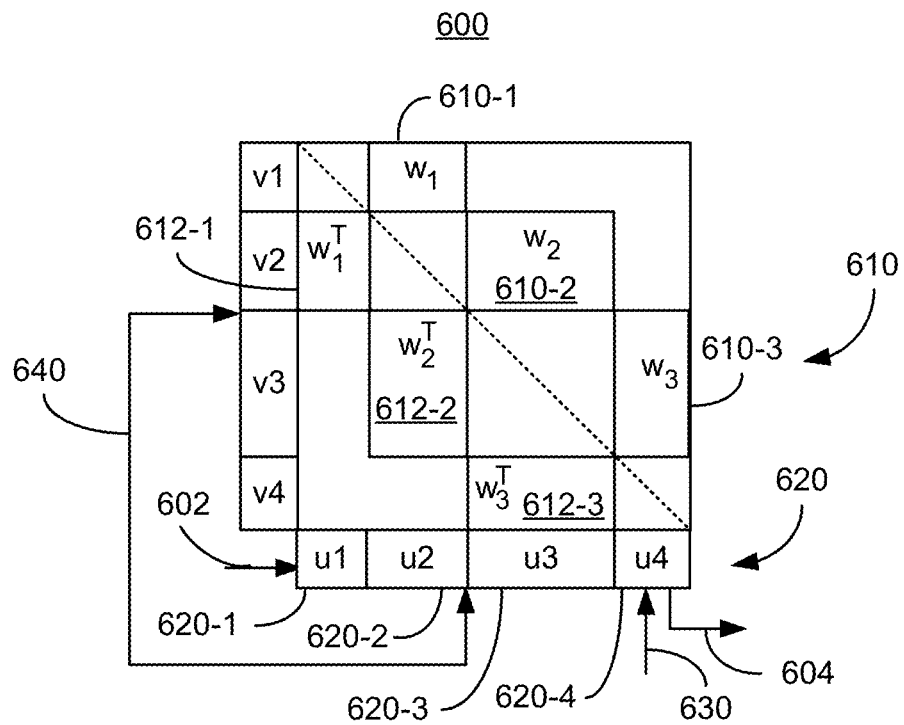
FIG. 6 depicts an embodiment of a learning network that may be trained using activity-difference training.

FIG. 6 depicts an embodiment of learning network 600 that is analogous to learning network 100. More specifically, learning network 600 may be described by an energy analogous to that described above with respect to learning network 100. For example, the interaction term for the energy may consist of neuron pair interactions. Thus, the interaction term for the energy of learning network 600 is a quadratic term. Learning network 600 may be an artificial neural network that may be trained using activity-difference training analogous to that described for method 400. Learning network 600 includes system inputs 602, system outputs 604, sparsely coupled crossbar array 610, neuron layers 620-1, 620-2, 620-3, and 620-4 (collectively or generically 620), bias 630 and feedback 640. System inputs 602, system outputs 604, sparsely coupled crossbar array 610, neuron layers 620, and bias 630 are analogous system inputs 102, system outputs 104, vector MM units 110, neuron layers 120, and bias 130. Thus, learning network 600 may be viewed as one implementation of learning network 100.

In the embodiment shown, the system inputs 602, system outputs 604, bias 630 and feedback 640 are shown as single arrows. However, in general multiple system inputs, multiple system outputs, multiple feedback lines and multiple bias lines are present. Although a particular configuration is shown (e.g., four neuron layers 620 and a particular number of submatrices in sparsely coupled crossbar array 610) other configurations may be possible. Further, although system inputs 602 are shown as being connected provide to first neuron layer 620-1, in some embodiments, inputs are provided to sparsely coupled crossbar array 610.

Sparsely coupled crossbar array 610 can be divided into portions that can be viewed as matrices and their transposes. Thus, sparsely coupled crossbar array 610 includes regions 610-1, 610-2, and 610-3 configured as matrices $w_1$, $w_2$, and $w_3$. Regions 610-1, 610-2, and 610-3 provide a vector matrix multiplication of matrices $w_1$, $w_2$, and $w_3$, respectively, with input signals v1, v2, and v3, respectively. Sparsely coupled crossbar array 610 also includes regions 612-1, 612-2, and 612-3 configured as weight matrix transposes $w_1^T$, $w_2^T$, and $w_3^T$, respectively. Thus, regions 612-1, 612-2, and 612-3 provide a vector matrix multiplication of weight matrix transposes $w_1^T$, $w_2^T$, and $w_3^T$, respectively, with input signals v2, v3, and v4, respectively.

For example, region 610-1 includes weights (i.e. programmable resistances) that are coupled between lines of this portion of crossbar array 610. The weights for regions 610-1 are analogous to weights in a vector MM unit between neuron layer 620-1 and neuron layer 620-2. Thus, region 610-1 may be considered analogous to vector MM unit 120-1. Region 612-1 includes weights that are coupled between lines of this portion of a crossbar array that correspond to the transpose weights in a vector MM unit between neuron layer 620-1 and neuron layer 620-2. Regions 610-2 and 610-3 and regions 612-2 and 612-3, respectively, are similarly configured. Thus, sparsely coupled crossbar array 610 is configured to provide a matrix multiplication of matrices and, across the diagonal (indicated by the dotted line in FIG. 6), their transposes.

As previously mentioned, crossbar array 610 is sparsely coupled. Individual regions 610-1, 610-2, 610-3, 612-1, 612-2, and 612-3 may be sparsely or fully coupled depending upon the configuration of individual matrices and their transposes. Neuron layers 620 provide their output signals (u1, u2, u3, and u4) to the inputs as input signals (v1, v2, v3, and v4, respectively) via feedback 640. For example, output signals u1 of neuron layer 620-1 are provided via feedback 640 as input signals v1. Thus, crossbar array 610 may provide a symmetric, zero-diagonal weight matrix for learning network 600 having an energy including an interaction term consisting of neuron pair interactions.

Neuron layers 620 are analogous to neuron layers 120. Thus, each neuron layer 620 includes neurons that are interconnected via the corresponding weight matrix. For example, neuron layer 620-1 includes neurons that are interconnected with neurons in layer 620-2 via region 610-1 of crossbar array 610. Thus, the outputs of one neuron layer may be coupled with the inputs of another neuron layer via feedback 640. Neurons in neuron layers 620 also utilize thresholding functions, such as hysteretic thresholding functions. As such, learning network 600 may enhance and/or suppress noise as described in the context of graphs 300B-300E, learning network 100, and/or method 400.

Crossbar array 610 in conjunction with neuron layers 620, system inputs 602, system outputs 604, bias 630 and feedback 640 provides an equivalent of a multi-layered deep neural network that may be trained via activity-difference training. For example, a free inference may be performed (e.g., at 402 of method 400). To do so, the neuron output signals u1 from neuron layer 620-1 are provided via feedback 640 as input signals v1. Input signals v1 are multiplied by weight matrix $w_1$ of region 610-1. The weighted input signals from the matrix multiplication of $w_1$ are provided to neurons 620-2, resulting in neuron output signals u2. Neuron output signals u2 from neuron layer 620-2 are provided via feedback 640 as input signals v2. Input signals v2 are provided to matrix $w_2$ of region 610-2 and to matrix $w_1^T$ of region 612-1. Input signals v2 are multiplied by weight matrix $w_2$ of region 610-2 and by $w_1^T$ of region 612-1. The weighted input signals from the matrix multiplication with $w_2$ are provided to neurons 620-3, resulting in neuron output signals u3. The neuron output signals u3 from neuron layer 620-3 are provided via feedback 640 as input signals v3. Input signals v3 are provided to matrix $w_3$ of region 610-3 and to matrix $w_2^T$ of region 612-2. Input signals v3 are multiplied by weight matrix $w_3$ of region 610-3 and by $w_2^T$ of region 612-2. The weighted inputs from the matrix multiplication with $w_3$ are provided to neurons 620-4, resulting in neuron output signals u4. Neuron output signals u4 may be provided as system outputs 604 as well as fed back as input signals v4. Input signals v4 are provided to matrix $w_3^T$ of region 612-3 and multiplied by weight matrix $w_3^T$ of region 612-3. Use of the transpose matrices in regions 612-1, 612-2, and 612-3 aids in carrying the bias signal to from later layers to earlier layers (e.g. from neuron layer 620-3 to neuron layer 620-2).

For a biased inference (e.g., 404 of method 400), bias signals are provided via bias 630 and fed back via feedback 640. The bias signals provided via bias 630 at the last set of neurons 620-4 (e.g., at system outputs 604) may nudge the output signals on system outputs 604 to be closer to the target output signals. In some embodiments, the bias signals may clamp the output signals at the target output signals. Thus, the bias signals may be considered to provide a version of clamping (i.e. from little clamping to full clamping). With each subsequent cycle of updating the outputs, the bias information is propagated backwards across the equivalent layers of the multi-layered network. Locations in learning network 600 may be sampled for the biased and free inferences to determine equilibrium states of learning network 600 (e.g., at 406 of method 400). Weights in regions 610-1, 610-2, 610-3, 612-1, 612-2, and 612-3 are updated based on the free and biased inferences as well as the equilibrium states (e.g., at 408 of method 400). Further, the thresholding functions utilizes by neurons in neuron layers 620 may be updated. Thus, learning network 600 may be trained using activity-difference training.

Thus, learning network 600 may be trained by activity-difference training. This process uses only locally available information. Explicitly calculating and propagate gradients for minimizing errors (which is typical in back-propagation) is unnecessary. Learning network 600, with one matrix multiplication cycle per layer, may converge on a minimum in the energy (i.e. complete training) with accuracies that are substantially similar to traditional networks requiring a large overhead (i.e. a large number of matrix multiplication cycles to converge on the minimum). Although learning network 600 utilizes a single sparse crossbar array 610 including bidirectional/symmetric weight matrices, other equivalent architectures are possible. Some other embodiments described herein may utilize such other architectures.

Circuit noise and temporal variabilities have proven prohibitive in adoption of many hardware platforms for activity-difference training, especially for high-precision and storage applications. However, the thresholding functions described herein may be used in conjunction with neuron layers 620 to facilitate convergence on a global energy minimum for activity-difference training. Such noisy hardware, in a broad sense, would be unsuitable for backpropagation due to its analytical and exact nature. Thus, learning network 600 may be well suited for manufacturable post-CMOS hardware.

Learning network 600 thus creates a bidirectional energy-based equivalent of a deep neural network, such as learning network 100. Learning network 600 also allows the adjustment weights of regions 610-1, 610-2, and 610-3 to be treated as an optimization problem. Method 400 may be used to train learning network 600. Thus, the benefits of method 400 and/or learning network 100 may also be achieved in learning network 600. Moreover, learning network 600 may be either clocked (synchronized) or asynchronous. If operated asynchronously, latencies may be minimized drastically relative to the clocked embodiments. Consequently, learning network 600 is an efficient system for performing learning using activity-difference training that may be readily implemented.

Figure 7:
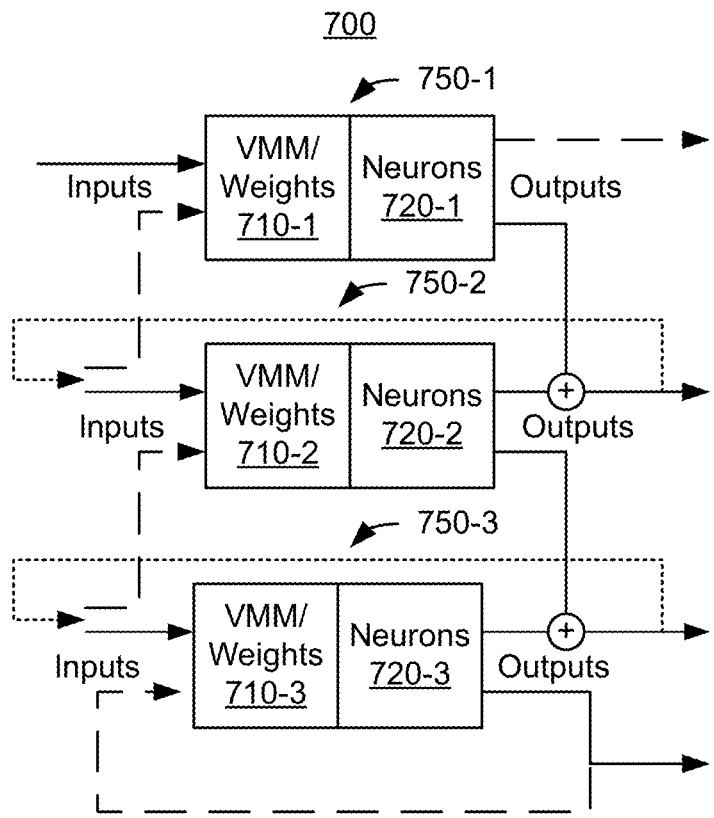
FIG. 7 depicts an embodiment of a learning network that may be trained using activity-difference training.
Figure 8:
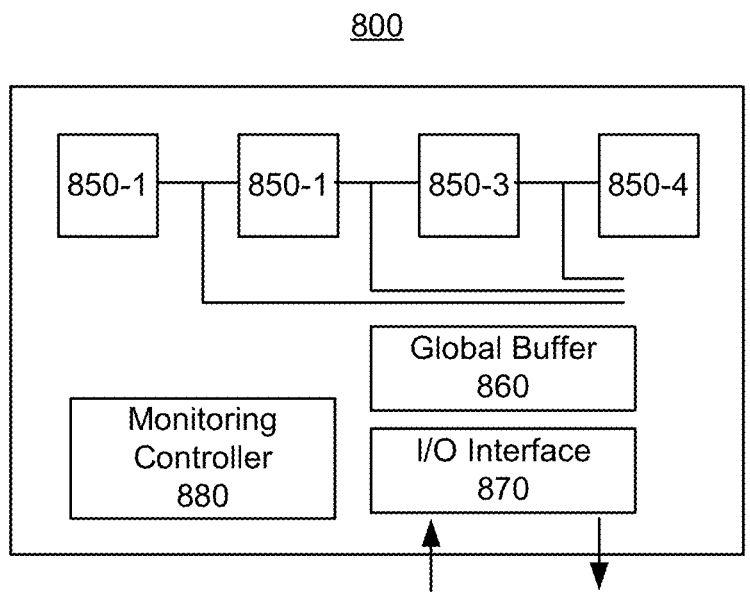
FIG. 8 depicts an embodiment of a learning network that may be trained using activity-difference training.
Figure 9:
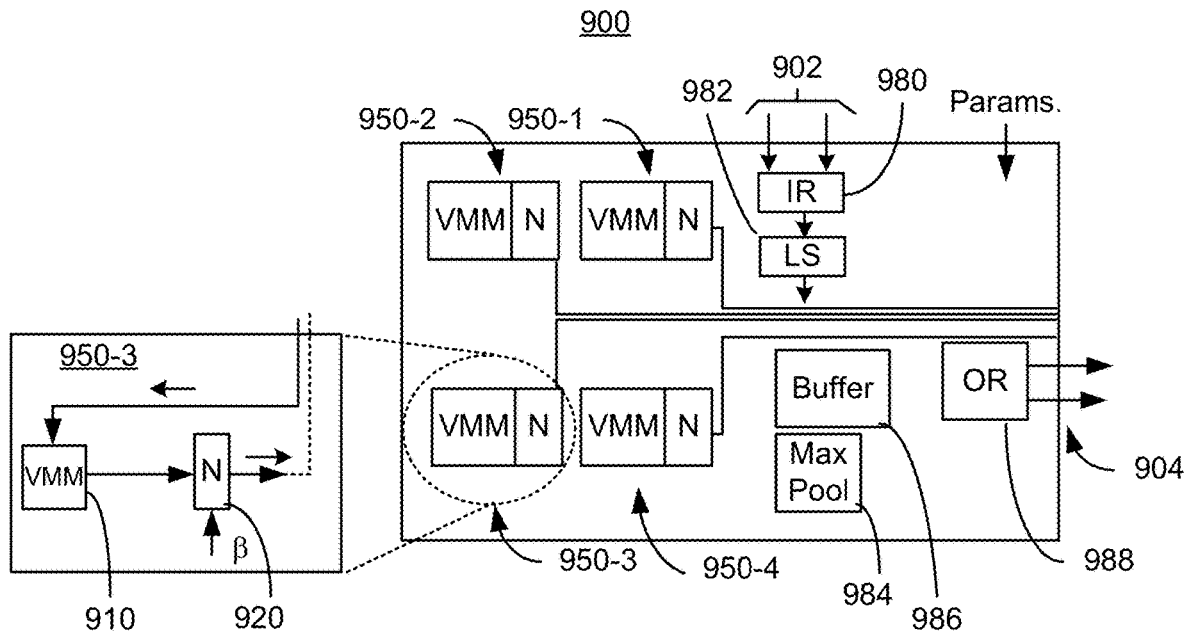
FIG. 9 depicts an embodiment of a learning network that may be trained using activity-difference training.
Figure 10:
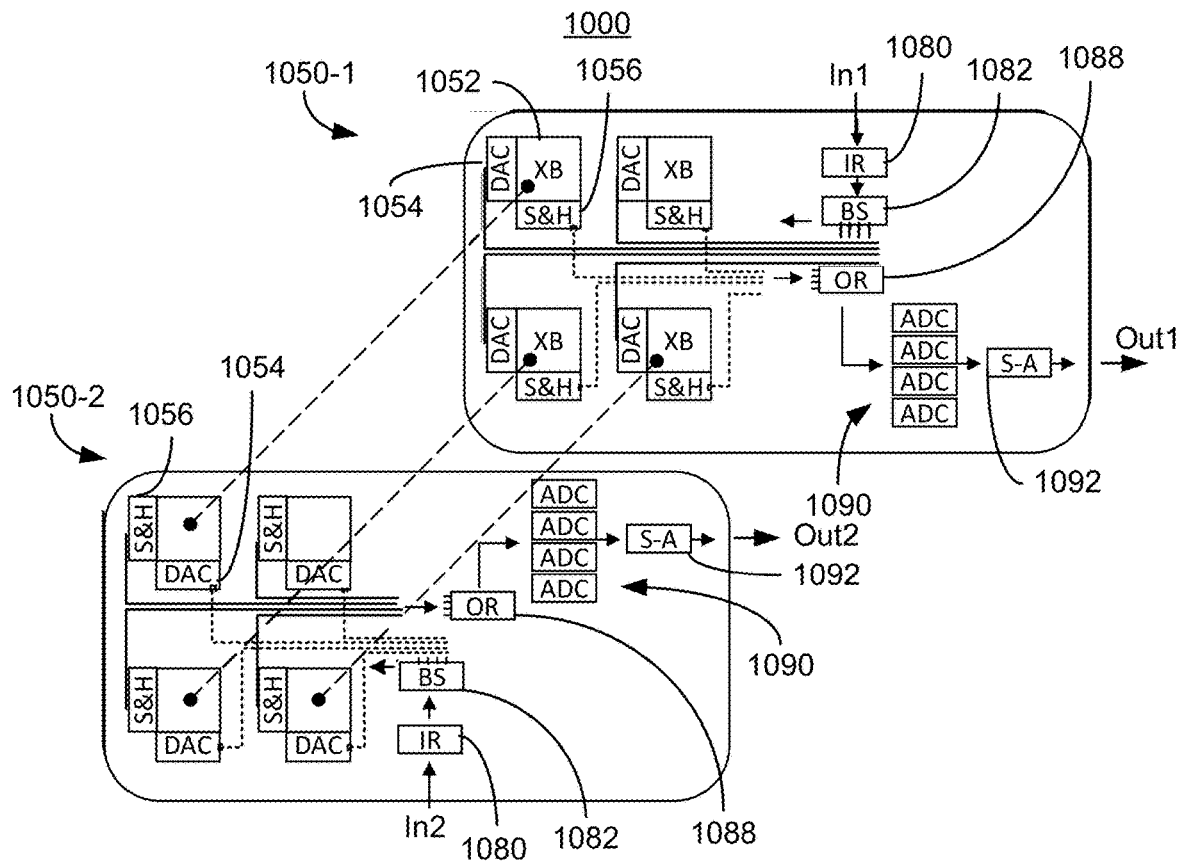
FIG. 10 depicts an embodiment of a learning network that may be trained using activity-difference training.
Figure 11:
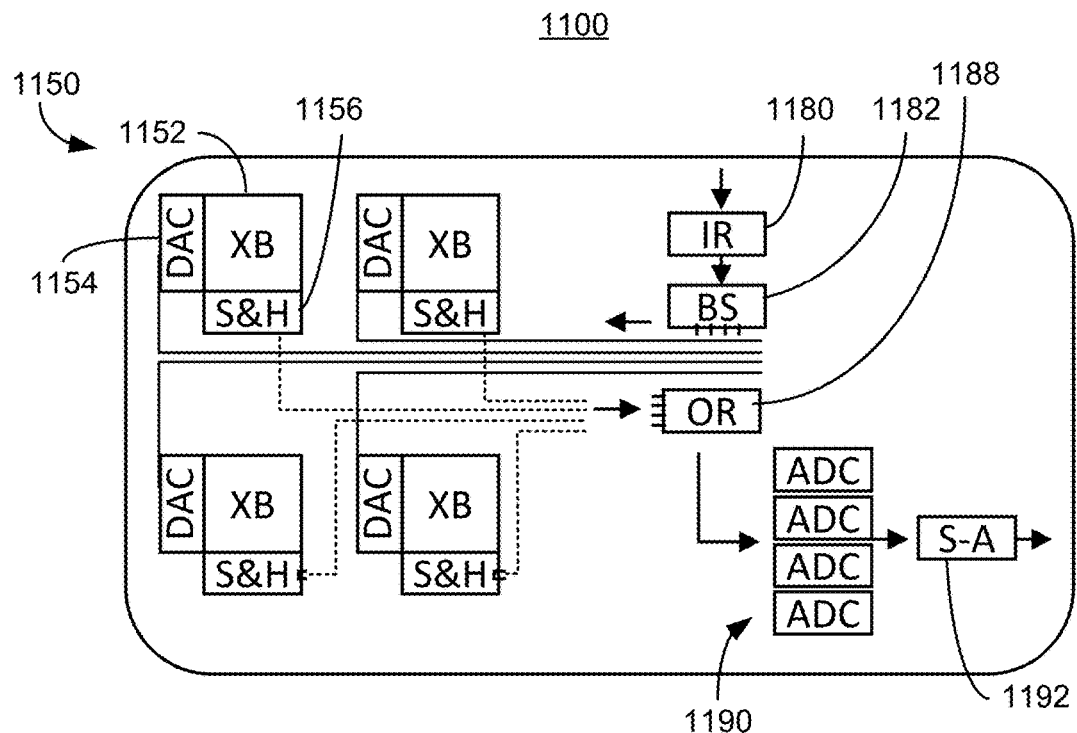
FIG. 11 depicts an embodiment of a learning network that may be trained using activity-difference training.

FIGS. 7-14 depict embodiments of learning networks 700, 800, 900, 1000, 1100, 1200, 1300, and 1400, respectively. Learning networks 700, 800, 900, 1000, 1100, 1200, 1300, and 1400 are analogous to learning networks 100, 500, and/or 600. Thus, learning networks 700, 800, 900, 1000, 1100, 1200, 1300, and 1400 are described by an energy function analogous to those discussed above with respect to learning networks 100, 500, and 600; may include in their energy function an interaction term that consists of neuron pair interactions (e.g., that are quadratic and may be implemented using a crossbar array); include neurons that use thresholding functions, such as hysteretic thresholding functions; may enhance and/or suppress noise as described in the context of graphs 300B-300E, learning networks 100, 500, and 600 and/or method 400; and may be artificial neural networks trained using activity-difference training analogous to that described for method 400. In some embodiments, learning networks 700, 800, 900, 1000, 1100, 1200, 1300, and 1400 may be viewed as implementations of learning network(s) 100, 500, and/or 600. FIGS. 9-11 relate to synchronized learning systems, while FIGS. 12-14 relate to asynchronous learning systems.

Referring to FIG. 7, learning network 700 is a schematic indicating the data flow for an embodiment of a learning network analogous to learning network 600. Learning network 700 includes three layers 750-1, 750-2, and 750-3 (collectively or generically 750). Layer 750-1 includes a first set of weights (i.e. a vector MM unit) 710-1 and neuron layer 720-1. Layer 750-2 includes weights (i.e. a vector MM unit) 710-2 and neuron layer 720-2. Layer 750-3 includes weights (i.e. a vector MM unit) 710-3 and neuron layer 720-3. Weights 710-1, 710-2, and 710-3 (collectively or generically 710) are analogous to crossbar array 610. Neuron layers 720-1, 720-2, and 720-3 (collectively or generically 720) are analogous to neuron layers 620. The forward data paths are represented by solid lines, the feedback paths (analogous to feedback 640) are represented by dotted lines and the reverse path (e.g., for bias signals) are represented by dashed lines. The reverse paths (dashed lines) are provided to the inputs that correspond to the transpose of the matrix for the corresponding weights 710. The forward paths are provided to inputs that correspond to the matrix for corresponding weights 710. Thus, the forward path results in a vector matrix multiplication by the weight matrix, while the reverse path results in a vector matrix multiplication by the transpose of the weight matrix. The data paths shown in learning network 700 may be implemented using a single weight matrix and bi-directional hardware (i.e. analogous to learning system 600) or by distinct data flow paths including distinct weight matrices (e.g., one crossbar array corresponding to the weight matrix and another crossbar array corresponding to the transpose of the weight matrix) and corresponding hardware (e.g., analogous to learning system 500). Thus, as indicated above, the architecture of learning network 600 may be implemented in a number of ways.

FIG. 8 depicts a high level diagram of an embodiment of learning network 800 including layers 850-1, 850-2, 850-3, and 850-4 (collectively or generically 850), global buffer 860, I/O interface 870, and monitoring controller 880. For clarity, only some components of learning network 800 are shown. Learning network 800 may be considered to be a chip level view of a learning network implementing learning network 100 and/or 600. Each layer 850 includes a layer of weights (e.g., a vector MM unit such as a crossbar array) and a layer of neurons. I/O interface 870 monitors and manages inputs to and outputs from learning network 800.

Learning network 800 may also be used and account for noise. As described in the context of learning networks 100, 500, 600, and 700, as well as graphs 300A-300E, noise may be amplified or suppressed via the thresholds of hysteretic threshold functions. In some embodiments, noise may be injected via the threshold, which exploits noise from control circuits. Noise may also be injected via neurons (e.g., via noisy neurons), via synapses (e.g., via synapses with temporal and/or non-temporal variations) and via non-zero diagonals for weight matrices (representing self-feedback of neurons, which introduce energy ascent and therefore escaping local minima).

Injection of noise in energy-based systems may be important because real-world problems generally contain many local minima (incorrect solutions for activity-difference training) in addition to the global minimum (the correct solution for activity difference-training). Thus, the energy function desired to be minimized by activity-different training may include local minima which do not represent a state of the learning network being optimized by training. Such local minima can trap the learning network, leading to non-optimized training and poor performance of the learning network. To avoid this, tunable noise can be used to perturb the system out of the local minima. In such a process, the initial magnitude of noise would be large (to perturb the system out of all the local minima), and the final noise magnitude will be low (to trap the system in the global minimum after it has reached one).

In some embodiments, the injection of noise, the use of noise in training, and error correction may be performed by learning network 800. In order to employ noise to improve the training of learning networks, monitoring controller 880 may be used. In particular, monitoring controller 880 may examine the state of learning system 800 via local buffers (e.g., buffer 986 depicted in FIG. 9) and global buffers (e.g. global buffer 860). In such an embodiment, data from local buffers 986 and global buffers 860 may be used to infer the weights (e.g. in vector MM units 910) for some or all layers 850. The evolution of the weights may be used to identify the energy of learning network 800 and the evolution of this energy. The evolution of learning system 800 via activity-difference training may be paused and restarted at different initial conditions. This process can be used to explore many different parts of the energy landscape, which may be useful in exploring highly multi-dimensional spaces. Thus, learning network 800 may ensure that activity-difference training does not result in learning network 800 becoming trapped in a local minimum. Consequently, training of learning network 800, and thus learning network(s) 100, 500, 600, and/or 700, may be improved.

Learning network 800 may also utilize monitoring controller 880 and a similar process to account for errors. More specifically, the state of learning network 800 may be monitored in a similar manner (e.g., via global buffer 860 and local buffers 986) to maintain the integrity of the information flowing through the different layers of the learning network 800. If such information is corrupted during propagation (e.g., the training data), then training of learning network 800 would be solving a problem that we did not ask it to solve. Training of learning network 800 may be suspended and restarted. Hence, periodic monitoring of learning network 800 may keep the errors from propagating. Thus, performance of learning network 800 may be improved.

FIG. 9 depicts an embodiment of learning network 900 that may be used in implementing learning network 800. For simplicity, not all components of learning network 900 are shown. Learning network includes system inputs 902, system outputs 904, layers 950-1, 950-2, 950-3, and 950-4 (collectively or generically 950), input register (IR) 980 coupled to inputs 902, level splitter (LS) 982 coupled to IR 980, max pool 984, buffer 986, and output register 988. A more detailed view of one layer 950-3 is also shown. Other layers 950 may be constructed analogously. Layer 950-3 includes vector MM unit 910 and neuron layer 920. Vector MM unit 910 may be a crossbar array. Neuron layer 920 includes neurons that may use thresholding functions such as hysteretic thresholding functions. Also shown is settable threshold, β, for neuron layer 920. LS 982 is used to split input signals to match the sizes of vector MM units 910.

FIG. 10 depicts an embodiment of a portion of learning network 1000 that may be trained using activity-difference training and is analogous to learning networks 100 and 600. More specifically, learning network 1000 may be used to perform the vector matrix multiplication by vector MM unit 910 of layers 950 depicted in FIG. 9. Learning network 1000 includes layers 1050-1 and 1050-2 (collectively or generically 1050) that are analogous to layers 950 of learning network 900. Each layer 1050 includes input registers (IR) 1080, bit splitter (BS) 1082, OR gate 1088, analog to digital converters (ADCs) 1090, shift and add (S-A) 1092. In order to provide vector MM units 910 of FIG. 9, learning network 1000 includes multiple crossbar arrays (XBs) 1052, digital-to-analog converters (DACs) 1054, and sample-and-hold circuits (S&Hs) 1056. For simplicity, only one DAC 1054 and S&H 1056 is labeled in each layer 1050. XBs 1052 are used to perform the vector matrix multiplication operations. Layers 1050-1 and 1050-2 share XBs 1052, as indicated by dashed lines in FIG. 10. The configurations of the S&H 1056 and DAC 1052 differs between layers 1050-1 and 1050-2. Consequently, layer 1050-1 performs a vector matrix multiplication of the weight matrix represented by XBs 1056. In contrast, layer 1050-2 performs a vector matrix multiplication of the transpose of the weight matrix represented by XBs 1056. In some embodiments, layers 1050-1 and 1050-2 may be manufactured as two neighboring layers in a chip architecture, which is typical in CMOS design. Layers 1050-1 and 1050-2 may, for example, be used in implementing regions 610-1 and 612-1 of learning network 600.

In layers 1050, each multiply and accumulate operation (i.e. each vector multiplication operation) includes splitting a given array or matrix to be multiplied into several bits and distributing the operation on each bit to different hardware pieces (e.g., different XBs 1052). Consequently, learning network 100 may retain the desired accuracy. For example, each hardware operation may maintain more than 1 bit of accuracy. Further, multiplications of both the weight matrix and its transpose are performed on the same XB 1052. As a result, inter-array errors that might otherwise be introduced may be mitigated or avoided. Thus, use of learning network 1000 may provide additional benefits to learning networks such as learning networks 100, 500, and/or 600.

In alternate embodiments, each layer may include its own XBs. FIG. 11 depicts learning network 1100 in which each layer 1150 includes its own XBs. Layer 1150 includes IR 1180, BS 1182, OR 1188, ADCs 1190, S-A 1192, XBs 1152 (of which only one is labeled), DACs 1154 (of which only one is labeled), and S&Hs 1156 (of which only one is labeled) that are analogous to IR 1080, BS 1082, OR 1088, ADCs 1090, S-A 1092, XBs 1052, DACs 1054, and S&Hs 1056, respectively, of layer 1050-1. However, each layer 1150 in learning network 1100 includes its own XBs 1152. For example, one layer 1150 might be used in implementing region 610-1 of learning network 600, while another layer 1150 may be used in implementing region 612-1 of learning network 600. In such an embodiment, the XBs 1152 for such layers would be configured as matrix transposes. Learning network 1100 shares the benefits of learning network 100 with respect to accuracy. However, inter-array variations may adversely affect performance of layer 1150.

Learning networks 800, 900, 1000, and 1100 may be synchronous networks. In some embodiments, the clock progression for learning networks 800, 900, 1000, and/or 1100 may proceed from the chip level (e.g., the level depicted in FIG. 8), to the layer level (e.g., the levels depicted in FIG. 9), the vector matrix multiplication level (e.g., the level depicted in FIGS. 10-11), to the layer level (e.g., the levels depicted in FIG. 9), and back to the chip level (e.g., the level depicted in FIG. 8). For example, operations for the I/O interface 870 and global buffer 860 may be performed first. Layer level operations for IR 980, buffer 986, and LS 982 may be performed next. Vector matrix multiplication operations for IR 1080/1180, BS 1082/1182, DACs 1054/1154, XB 1052/1152, S&H 1056/1156, ADCs 1090/1190, S-A 1092/1192, and OR 1088/1188 may then be performed. Layer level operations for neurons 920, buffer 986, max pool 984, and OR 988 may follow. Chip level operations for the global buffer 860 and I/O interface 870 may complete the progression.

Figure 12:
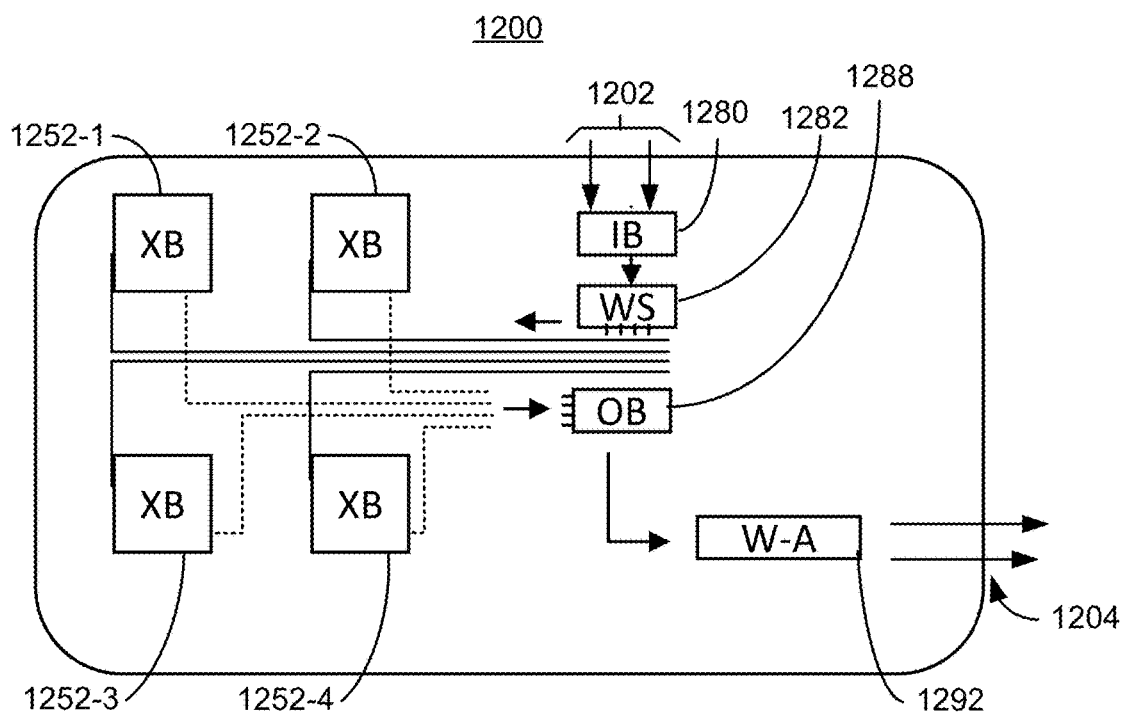
FIG. 12 depicts an embodiment of a learning network that may be trained using activity-difference training.
Figure 13:
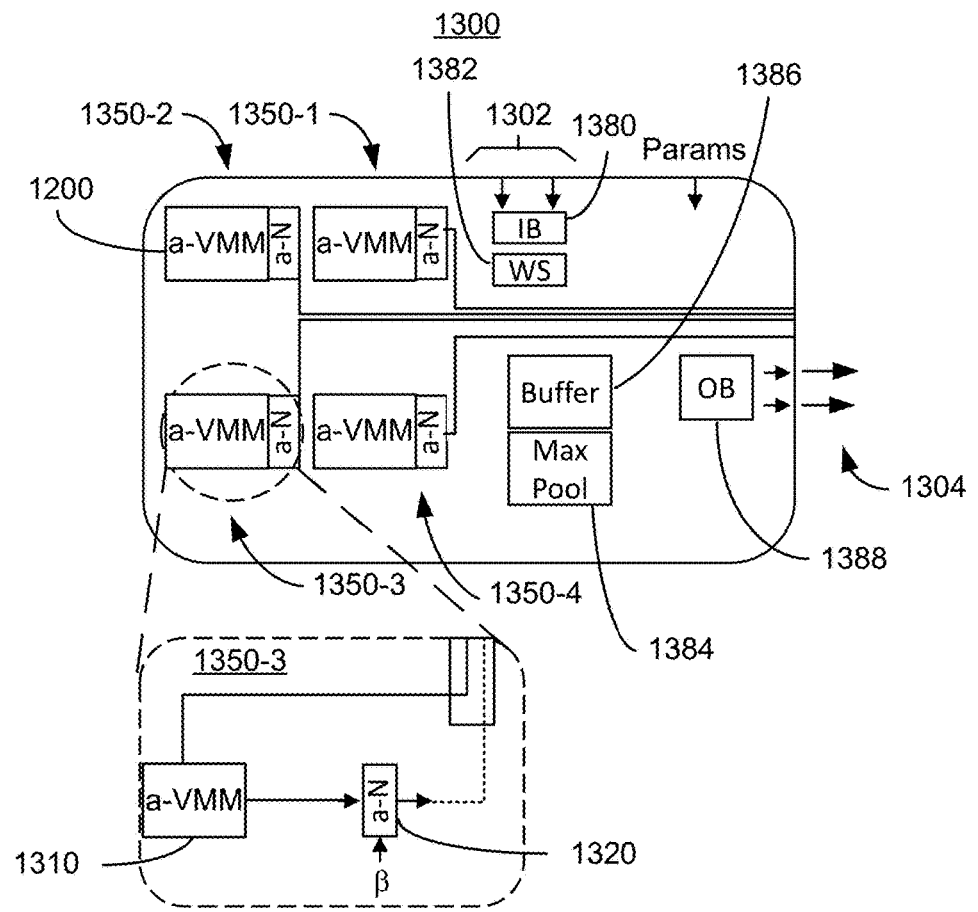
FIG. 13 depicts an embodiment of a learning network that may be trained using activity-difference training.
Figure 14:
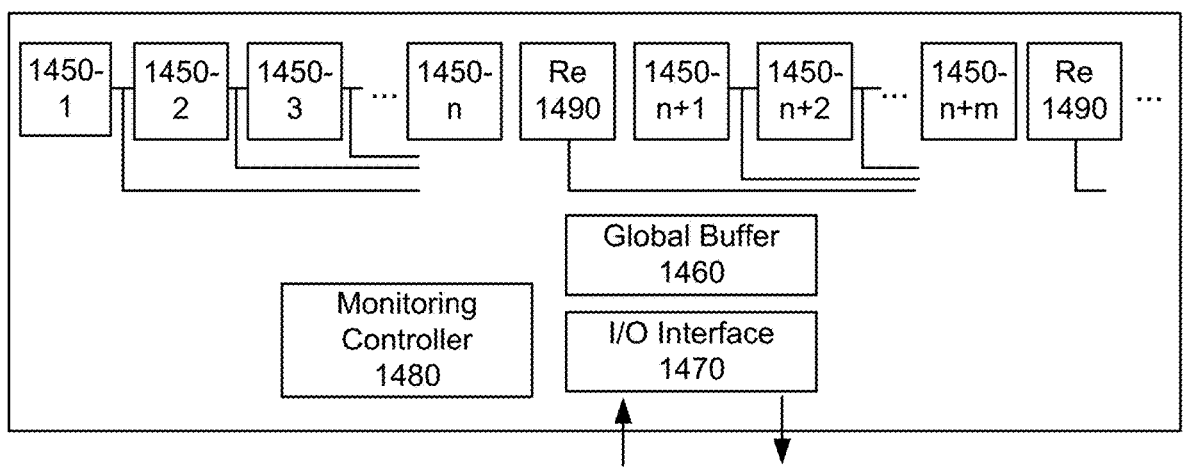
FIG. 14 depicts an embodiment of a learning network that may be trained using activity-difference training.

Although learning networks 900, 1000, and 1100 are clocked, in some embodiments, learning networks can utilize the activity-difference training and inference processes described herein without a clocking signal (i.e., in an all-analog, asynchronous or continuous-time fashion). The same general chip-level structure of learning network 800 depicted in FIG. 8 may be utilized in some asynchronous embodiments. FIGS. 12-14 depict embodiments of portions of learning networks 1200, 1300, and 1400 that may be asynchronous.

FIG. 12 depicts an embodiment of learning network 1200 that may be used in implementing learning network 800 for asynchronous learning. Learning network 1200 is also analogous to, for example, learning networks 100, 600, 1000, and/or 1100. For simplicity, not all components of learning network 1200 are shown. Learning network includes inputs 1202, outputs 1204, crossbars 1252-1, 1252-2, 1252-3, and 1252-4 (collectively or generically 1252), input buffer (IB) 1280 coupled to inputs 1202, weight splitter (WS) 1282 coupled to IB 1280, output buffer 1288, and weight and add (W-A) 1292. Learning network 1200 may be used to asynchronously perform the vector matrix multiplication. Thus, learning network 1200 may be considered an asynchronous vector matrix multiplication unit (a-VMM).

FIG. 13 depicts an embodiment of learning network 1300 that may be used in asynchronously implementing learning network 800. For simplicity, not all components of learning network 1300 are shown. Learning network includes system inputs 1302, system outputs 1304, layers 1350-1, 1350-2, 1350-3, and 1350-4 (collectively or generically 1350), input buffer (IB) 1380 coupled to inputs 1302, wight splitter (WS) 1382 coupled to IB 1380, max pool 1384, buffer 1386, and output buffer 1388. A more detailed view of one layer 1350-3 is also shown. Other layers 1350 may be constructed analogously. Layer 1350-3 includes asynchronous vector MM unit (a-VMM) 1310 and asynchronous neuron layer (a-N) 1320. Asynchronous vector MM unit 1310 may be analogous to asynchronous vector MM unit 1200. Asynchronous neuron layer 1320 includes neurons that may use thresholding functions such as hysteretic thresholding functions. Also shown is sellable threshold, $\beta$, for neuron layer 1320.

Learning networks 1200 and 1300 are analogous to learning networks 1000/1100 and 900, respectively. However, asynchronous learning networks 1200 and 1300 generally do not contain data flow in digital formats (i.e., data flows in analog fashions) and there is no clocking signal. Because there is no clocking, the signals propagate through learning networks 1200 and 1300 much faster than in a synchronized learning network. Further, learning networks 1200 and 1300 may find solutions to training and inference problems very rapidly. However, as in all asynchronous systems, there may be issues with signal degradation, stability, oscillations, an/or other issues that may be desired to be accounted for.

FIG. 14 depicts regenerative asynchronous learning network 1400. Learning network 1400 includes layers 1400-1, 1450-2, 1450-3 through 1450-$n$, 1450-$n$+1 through 1450-$n$+$m$. Also shown are two regenerative circuits 1490. Other numbers of layers and/or regenerative circuits are possible in other embodiments. Learning network 1400 also includes monitoring controller 1480, global buffer 1460, and I/O interface 1470 that are analogous to monitoring controller 880, global buffer 860, and I/O interface 870, respectively. Regenerators 1490 may include or consist of digital-analog converters, buffers, clocking circuits, signal reconstruction circuits, signal monitoring circuits, and analogous components. Thus, regenerators 1490 may be considered repeaters used to enhance signals. As such, learning network 1400 may be considered to represent a middle ground between the synchronous learning networks 900, 1000, and/or 1100 and asynchronous learning networks 1200 and/or 1300. Thus, activity-difference training may be accomplished on synchronous learning networks (e.g., learning networks 900, 1000, and/or 1100 using digital clocking) as well as on asynchronous learning networks (e.g., learning networks 1200, 1300, and/or 1400). Thus, the benefits of activity-difference training described herein may be realized by a number of configurations.

In some embodiments, particularly where the problem sizes are large, hardware for learning networks may be desired to be reused. For example, if the problem size exceeds the available hardware resources, activity difference training described herein may be performed on a subset of the available hardware resources. Similarly, if the desired precision for a problem exceeds the abilities of the available hardware resources, activity difference training may be provided on portions of the problem. Thus, the available hardware resources (or some subset thereof) may be reused to solve subsets of the problem. The results may be combined to complete the solution.

Figure 15:
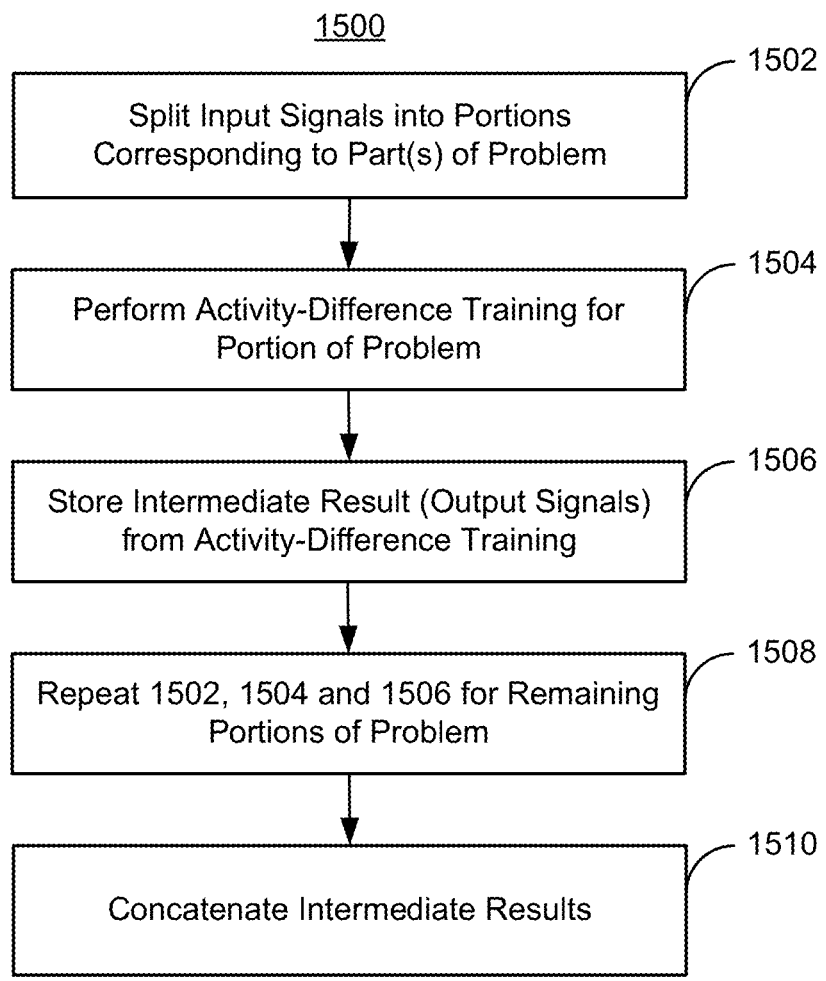
FIG. 15 depicts an embodiment of a method for performing activity-difference training on a learning network while reusing hardware resources.

For example, FIG. 15 depicts an embodiment of method 1500 for performing activity-difference training on a learning network, such as learning network 100, in which hardware resources may be reused to solve subsets of the problem. Although particular steps are depicted, method 1500 may include additional and/or other steps. Similarly, steps of method 1500 may include substeps. Method 1500 is described in the context of learning network 100. However, nothing prevents method 1500 from being used in conjunction with other networks having an analogous energy function (e.g., networks 500, 600, 700, 800, 900, 1000, 1100, 1200, 1300 and/or 1400). For example, other learning networks including neurons (e.g., neurons that thresholding functions) and vector MM units may be employed.

The input signals (i.e., training data) are split into portions that can be solved using the available hardware resources, at 1502. In some embodiments, only some input signals may be used for an iteration of method 1500. In some embodiments, input signals may be split based upon the precision for particular iterations. Also at 1502, the input signal(s) for the current iteration are selected. Activity-difference training is performed on the input signals selected, at 1504. In some embodiments, method 400 may be performed for 1504. The activity-difference training performed at 1504 may utilize all or only some of the available hardware resources. The results of the activity-difference training are stored, at 1506. For example, the intermediate solutions corresponding to the subset of the problem may be stored in a memory unit.

At 1508, processes 1502 (e.g., selection of the input signal(s) for the current iteration), 1504, and 1506 are repeated until the problem has been solved. 1508 may include reprogramming the hardware to represent the next subset of the problem, on which the activity-difference training continues. This process is repeated until the entire problem (or a desired portion of the entire problem) is solved. At 1510, the intermediate results that have been stored are concatenated to provide a final result. In some embodiments, method 1500 may utilize special processes, which may be managed by components such as an on-chip processor or an off-chip computer.

For example, at 1502 the input signal(s) to be used in connection with learning network 100 may be split. At 1504, the input signals(s) for the current iteration of method 1500 are provided to system inputs 102 and activity-difference training using method 400 performed. The intermediate result for the input signal(s) used in 1504 are stored, at 1506. This may be performed using portions of a computer system (e.g., a memory unit) not depicted in FIG. 1. At 1508, learning network 100 may be reprogrammed for the current iteration. Also at 1508, processes 1502, 1504, and 1506 are repeated for learning network 100. The results may be concatenated to solve the desired problem, at 1510. Thus, learning network 100 may be reused in order to attack problems which may exceed the available resources and/or precision of learning network 100. Consequently, the benefits described herein may be achieved for problems that are high-precision and/or large.

Figure 16:
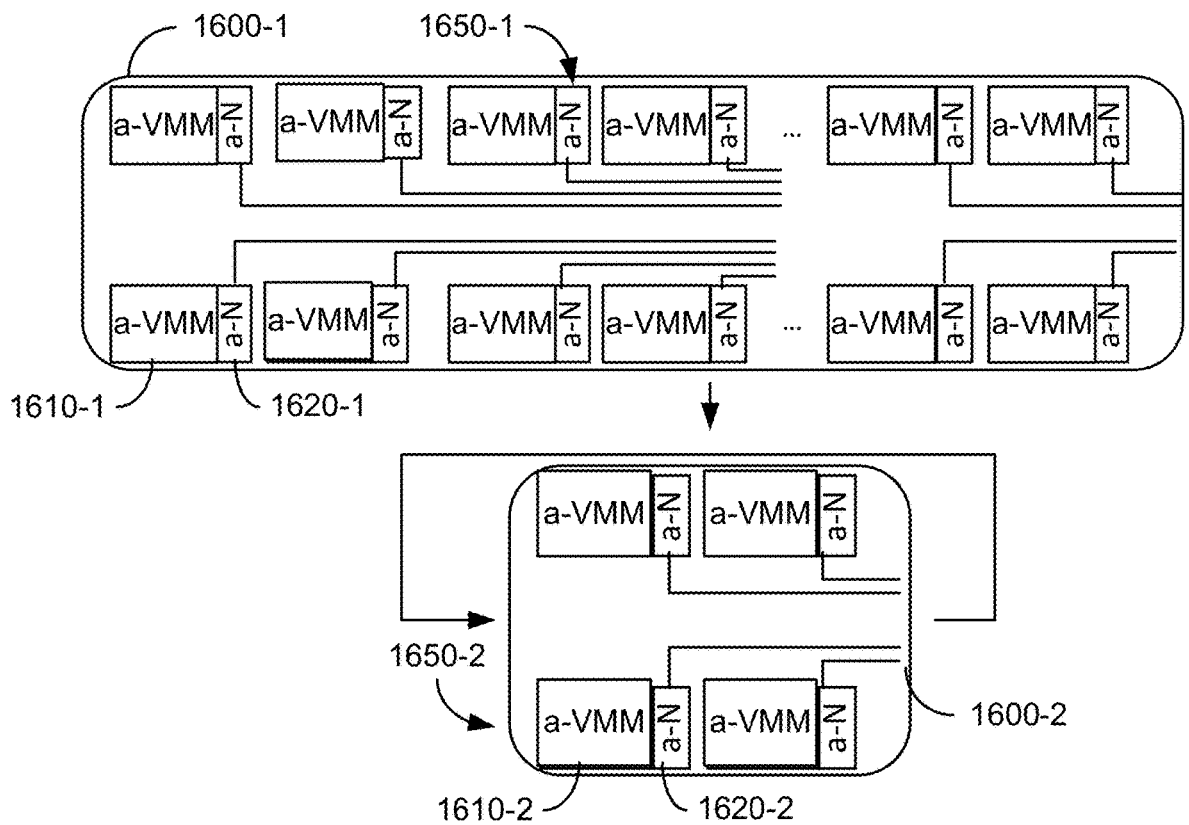
FIG. 16 depicts an embodiment of a learning network that may be trained using activity-difference training.

FIG. 16 depicts embodiment of learning networks 1600-1 and 1600-2 that may be trained using activity-difference training. For simplicity, not all components of learning networks 1600-1 and 1600-2 are shown. Learning networks 1600-1 and 1600-2 are analogous to learning networks 100, 500, and/or 600. Learning network 1600-1 is a large network including layers 1650-1 (of which only one is labeled). Each layer 1650-1 includes an asynchronous vector MM unit 1610-1 (of which only one is labeled) and asynchronous neurons 1620-1 (of which only one is labeled). Learning network 1600-2 is significantly smaller than learning network 1600-1. Learning network 1600-2 including layers 1650-2 (of which only one is labeled). Each layer 1650-2 includes an asynchronous vector MM unit 1610-2 (of which only one is labeled) and asynchronous neurons 1620-2 (of which only one is labeled). Both networks 1600-1 and 1600-2 may be used in to attack large and/or high precision problems. However, learning network 1600-2 may reuse hardware for problems which learning network 1600-1 may address without hardware reuse.

Learning network 1600-2 may manage problems otherwise requiring larger learning network 1600-1 by sharing limited resources to break down a problem into smaller pieces. Stated differently, learning network 1600-2 may be used in conjunction with method 1500. In some embodiments, the problem is broken into smaller portions sequentially (e.g., splitting by layers). Learning network 1600-2 may then be trained sequentially on each portion of the problem via method 1500. Similarly, a problem may be broken into smaller "more important" and "less important" parts, or a gradient thereof. For instance, the most significant bits (MSBs), which carry the more important representations of the problem, may be split from the least significant bits (LSBs), which carry information that is less important. Activity-difference training of only the MSB(s) part of the problem is performed on smaller learning network 1600-2. Learning network 1600-2 is reused in subsequent cycles to train lesser significant bits. In some embodiments, a controlling/monitoring computer (not shown in FIG. 16) identifies the point in time in method 1500 (i.e., in 1504) when the results yield diminishing returns, thereby stopping the training to provide an intermediate result. Using, hardware sharing or reuse enables smaller learning network 1600-2 to be used for a shorter duration of time by making the problem smaller. Thus, the benefits of activity-difference training on learning networks described herein may be maintained.

Figure 17:
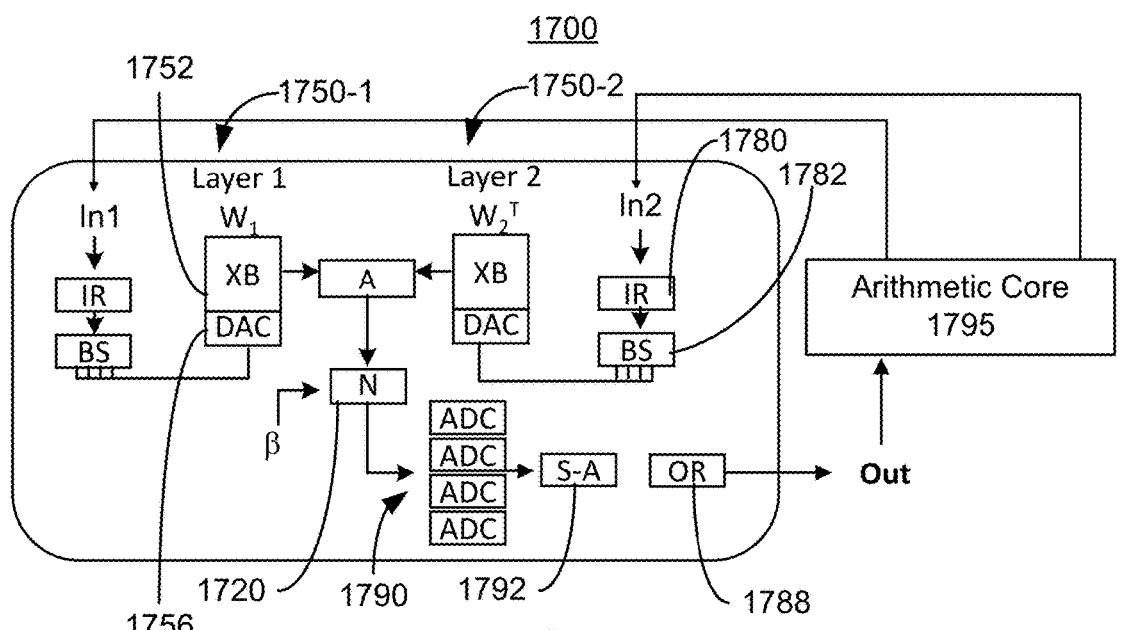
FIG. 17 depicts an embodiment of a learning network that may be trained using activity-difference training.

FIG. 17 depicts an embodiment of a portion of learning network 1700 that may be trained using activity-difference training and is analogous to learning networks 100, 600, and 1600. More specifically, learning network 1700 may be used to perform the functions of layers 1650-2 depicted in FIG. 16. Learning network 1700 includes layers 1750-1 and 1750-2 (collectively or generically 1750). Each layer 1750 includes input registers (IR) 1780 (of which only one is labeled), bit splitter (BS) 1782 (of which only one is labeled), crossbar array (XB) 1752 (of which only one is labeled), and digital to analog converter (DAC) 1756 (of which only one is labeled)). Learning network 1700 also includes shared OR gate 1788, shared analog to digital converters (ADCs) 1790, shared shift and add (S-A) 1792, shared neurons 1720 having threshold β, and arithmetic core 1795. Learning network 1700 extends the aforementioned use of in-memory computing crossbars to solve for energy minimization to include the summation of two vector matrix multiplication outputs at A and the application of a non-linear activation function at neurons 1720 in the analog domain. The output is provided to arithmetic core 1795. In some embodiments, multiple crossbars may be used in each layer 1750. Use of multiple crossbar arrays may, for example, support operation with binary nonvolatile memory cells in the crossbars. In such embodiments, the bits of the weights can be distributed across multiple crossbars.

Figure 18:
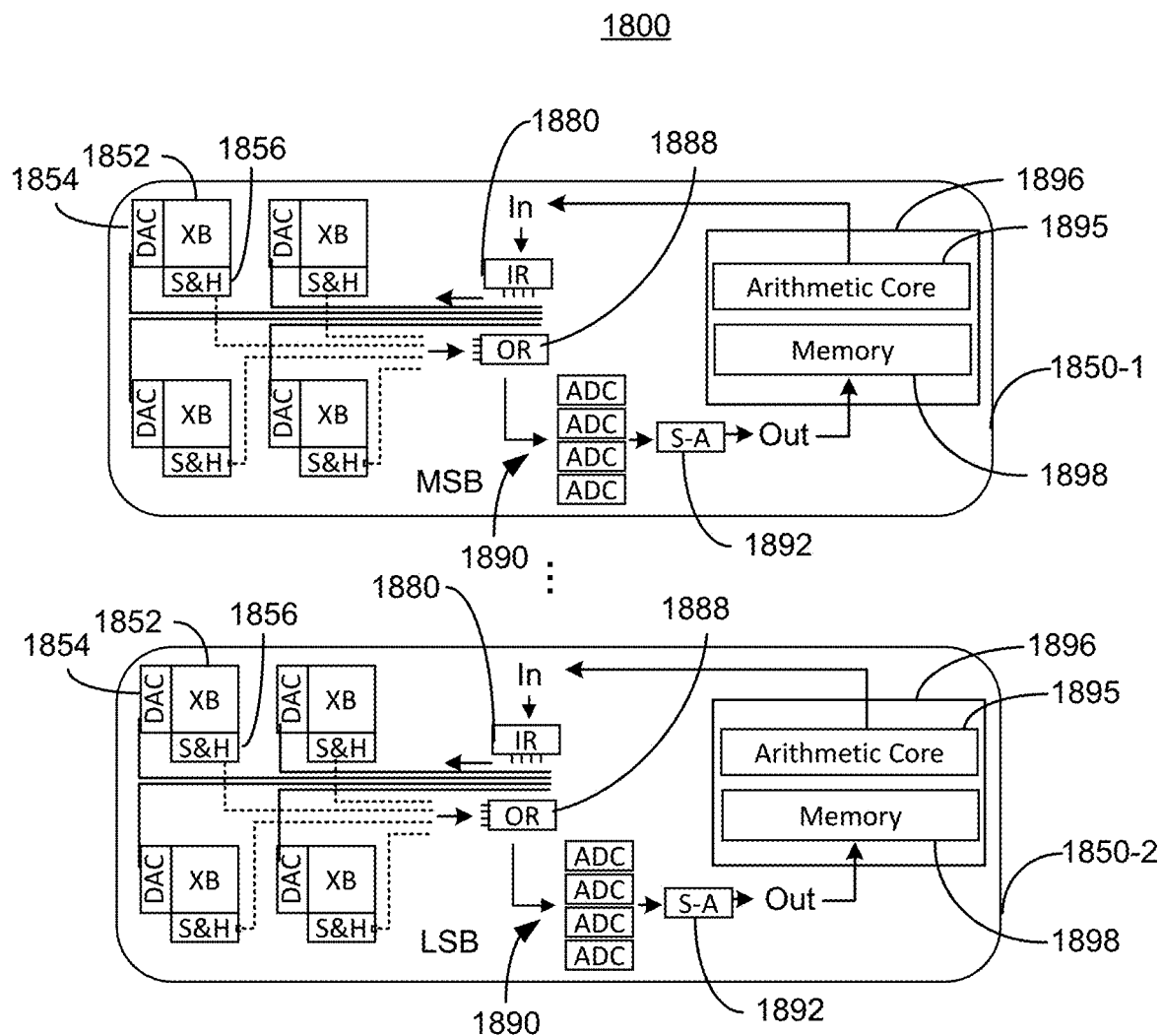
FIG. 18 depicts an embodiment of a learning network that may be trained using activity-difference training.

FIG. 18 depicts an embodiment of a portion of learning network 1800 that may be trained using activity-difference training and is analogous to learning networks 100, 600, and 1600. More specifically, learning network 1800 may be used to perform the functions of vector MM units 1610-2 depicted in FIG. 16. Further, learning network 1800 may be considered to be adapted to breaking a problem up based upon precision (e.g. from most significant bit to least significant bit).

Learning network 1800 includes layers 1850-1 through 1850-2 (collectively or generically 1850). Each layer 1850 includes input registers (IR) 1880, crossbar arrays (XBs) 1852 (of which only one is labeled), and digital to analog converters (DACs) 1856 (of which only one is labeled)), sample-and-hold circuits (S&Hs) 1856 (of which only one is labeled), OR gate 1888, analog to digital converters (ADCs) 1890, shift and add (S-A) 1892, and processor 1896. In some embodiments, XBs 1852 utilize nonvolatile memory elements as programmable impedances. Thus, XBs 1852 may provide binary weights. Processor 1896 may be a RISC processor including arithmetic core 1895 and memory 1898. Non-linear activations and finite difference methods may be executed by processor 1896.

Thus, learning network 1800 is self-contained and may locate minima (e.g., in the energy function) a network with binary weights present in XBs 1852. For an arbitrary multilayer, deep neural network with weights (synapses) of N-bit precision, N layers 1850 are used. Each layer includes binary weights in XBs 1852 representing a bit of the full network. Learning network 1800 makes use of in-memory computing through crossbars with NVM to accelerate the multiplications in a finite difference solver.

Figure 19:
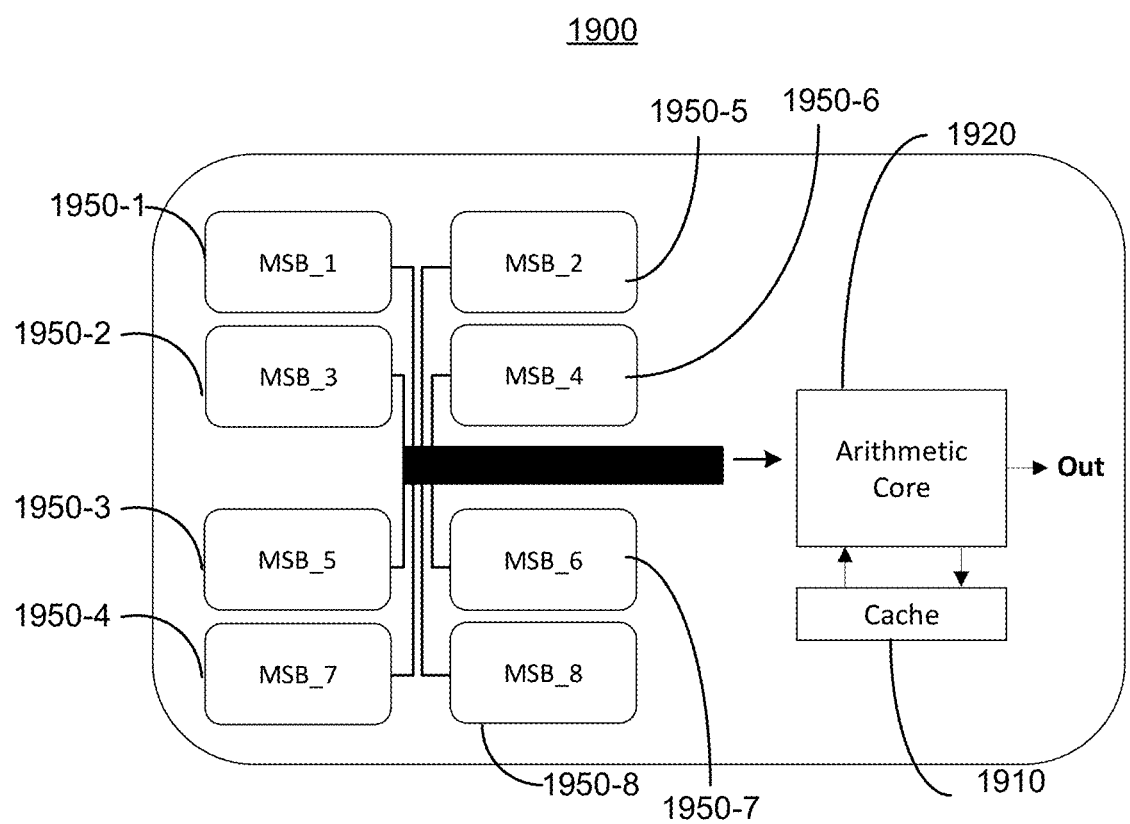
FIG. 19 depicts an embodiment of a learning network that may be trained using activity-difference training.

Learning network 1800 may be part of a system that divides problems based on the significance of the bits. For example, FIG. 19 depicts learning network 1900 in which learning system 1800 may be used. Learning network 1900 includes cache 1910, arithmetic core 1920 and layers 1950-1 through 1950-8 (collectively or generically 1950). Layer 1950-1 through 1950-8 corresponding to layers 1850-1 through 1850-2. Arithmetic core 1920 takes the equilibrium points of each of layers 1950 and uses a process (which may include but is not limited to averaging, linear operations and/or non-linear operations) to combine the outputs into one set of equilibrium points for the original n-bit network. Thus, the benefits of activity-difference training on learning networks described herein may be maintained for high precision problems.

Various features of learning networks have been described in conjunction with networks 100, 500, 600, 700, 800, 900, 1000, 1100, 1200, 1300, 1400, 1600, 1700, 1800, and 1900. Similarly, various processes have been described in the context of with methods 400 and 1500. Various features described herein may be combined in manners not explicitly depicted or discussed herein.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for performing learning, comprising:
performing, using a learning network, a free inference for a plurality of input signals, the plurality of input signals corresponding to a plurality of target output signals, the learning network including a plurality of inputs receiving the plurality of input signals, a plurality of weights corresponding to a plurality of programmable impedances, a plurality of neurons, and a plurality of outputs, the plurality of weights interconnecting the plurality of neurons, the learning network being described by an energy for the free inference, the energy including an interaction term corresponding to interactions between the plurality of neurons, the interactions consisting of neuron pair interactions, the free inference resulting in a plurality of output signals for the plurality of outputs, a first portion of the plurality of weights corresponding to data flow for the free inference;
providing the plurality of input signals to the plurality of inputs and a plurality of bias signals to the plurality of outputs to perform a biased inference, the plurality of bias signals being based on the plurality of target output signals and the plurality of output signals, the plurality of bias signals being fedback to the learning network through a second portion of the plurality of weights corresponding to a transpose of the first portion of the plurality of weights;
determining, at a plurality of locations in the learning network, learning network equilibrium states for the biased inference; and
updating the plurality of weights based on the learning network equilibrium states, the updating the plurality of weights including programming at least a portion of the programmable impedances.

2. The method of claim 1, wherein the interaction term includes a quadratic portion, the quadratic portion being proportional to $-\Sigma_{i=1}^{N}\Sigma_{j=1}^{N}W_{ij}u_{i}u_{j}$, where $W_{ij}$ is a weight of the plurality of weights between neuron i of the plurality of neurons and neuron j of the plurality of neurons, $u_i$ is a neuron output signal of neuron i, $u_j$ is a neuron output signal of neuron j, and N is a total number of neurons.

3. The method of claim 1, wherein the plurality of neurons is arranged in a plurality of neuron layers, the plurality of weights is arranged in at least one weight layer, and the at least one weight layer is interleaved with the plurality of neuron layers.

4. The method of claim 1, further comprising:
iteratively performing the performing the free inference, providing the plurality of input signals and the plurality of bias signals, determining the learning network equilibrium states, and the updating the plurality of weights.

5. The method of claim 1, wherein each of the plurality of neurons receives a. neuron input signal and performs a thresholding function for the neuron input signal to provide a neuron output signal.

6. The method of claim 5, wherein the thresholding function is a hysteretic thresholding function.

7. The method of claim 6, further comprising:
iteratively performing the performing the free inference, providing the plurality of input signals and the plurality of bias signals, determining the learning network equilibrium states, and the updating the plurality of weights; and
wherein the hysteretic thresholding function amplifies noise for a first portion of a plurality of iterations and suppresses noise for a second portion the plurality of iterations.

8. The method of claim 1, wherein the plurality of input signals is a portion of a plurality of split input signals and wherein the method further includes:
  carrying out the performing, providing, determining, and updating for a remaining portion of the plurality of split input signals; and
  concatenating final output signals for the plurality of split input signals.

9. A learning network comprising:
  a vector matrix multiplication (vector MM) unit, the vector MM unit being programmable and including at least one sparsely coupled crossbar array, a first portion of the at least one sparsely coupled crossbar array of the vector MM unit including a plurality of weights corresponding to a weight matrix, a second portion of the at least one sparsely coupled crossbar array of the vector MM unit including the plurality of weights and corresponding to a transpose of the weight matrix, each of the plurality of weights corresponding to a programmable impedance; and
  a neuron layer including a plurality of inputs, a plurality of outputs, and a plurality of neurons coupled between the plurality inputs and the plurality of outputs, the neuron layer being coupled with the vector MM unit such the plurality of inputs receive a plurality of weighted input signals from the first portion of sparsely coupled crossbar array of the vector MM unit and such that the plurality of outputs provide a plurality of neuron output signals to the second portion of the sparsely coupled crossbar array of the vector MM unit, the plurality of weights connecting a plurality of neuron pairs in the plurality of neurons;
  wherein the learning network is configured to receive a plurality of input signals corresponding to a plurality of target outputs, to provide a plurality of learning network output signals in response to the plurality of input signals, to receive a plurality of bias signals based on the plurality of target outputs and the plurality of learning network output signals, and to update the plurality of weights based on the plurality of bias signals, the plurality of target outputs, and the plurality of learning network output signals.

10. The learning network of claim 9, wherein each of the plurality of neurons receives a weighted input signal of the plurality of weighted input signals and performs a thresholding function to provide a neuron output signal of the plurality of neuron output signals.

11. The learning network of claim 10, wherein the thresholding function is a hysteretic thresholding function.

12. The learning network of claim 11, wherein the hysteretic thresholding function amplifies noise for a first portion of a plurality of iterations and suppresses noise for a second portion the plurality of iterations.

13. The learning network of claim 9, wherein the learning network is described by an energy including an interaction term corresponding to interactions between the plurality of neurons in the neuron layer, the interactions consisting of neuron pair interactions.

14. The learning network of claim 13, wherein the interaction term includes a quadratic portion, the quadratic portion being proportional to $-\Sigma_{i=1}^{N}\Sigma_{j=1}^{N}W_{ij}u_{i}u_{j}$, where $W_{ij}$ is a weight of the plurality of weights between neuron i of the plurality of neurons and neuron j of the plurality of neurons, $u_i$ is a neuron output signal of neuron i, $u_j$ is a neuron output signal of neuron j, and N is a total number of neurons, an inference resulting in a plurality of output signals for the plurality of outputs.

15. The learning network of claim 9, wherein the vector MM unit includes:
  a sparsely coupled crossbar array, a first portion of the sparsely coupled crossbar array corresponding to the first portion of the vector MM unit, a second portion of the sparsely coupled crossbar array corresponding to the second portion of the vector MM unit.

16. The learning network of claim 9, wherein the vector MM unit thrther includes:
  a sparsely coupled crossbar array, the neuron layer being coupled to the sparsely coupled crossbar array such that the plurality of inputs receives the plurality of weighted input signals from a matrix configuration of the vector MM unit and such that the plurality of neuron output signals is provided to the sparsely coupled crossbar array in a transposed matrix configuration.

17. The learning network of claim 9, wherein the plurality of input signals is a portion of a plurality of split input signals and wherein the learning network further includes:
  a splitter coupled with the vector MM unit for selecting the plurality of input signals from the plurality of split input signals; and
  a concatenation unit coupled with the vector MM unit and the neuron layer for combining the plurality of neuron output signals.

18. A learning network, comprising:
  a plurality of system inputs configured to receive a plurality of input signals;
  at least one vector matrix multiplication (vector MM) unit coupled with the plurality of system inputs, the at least one vector MM unit including a programmable and sparsely coupled crossbar array, each of the at least one vector MM unit including a first portion and a second portion, the first portion including a plurality of weights corresponding to a weight matrix, the second portion including the plurality of weights corresponding to a transpose of the weight matrix;
  a plurality of neuron layers, the at least one vector MM unit being interleaved and coupled with the plurality of neuron layers, each of the plurality of neuron layers including a plurality of inputs, a plurality of outputs, and a plurality of neurons coupled between the plurality inputs and the plurality of outputs, each of at least a portion of the plurality of neuron layers being coupled such that the plurality of inputs receive a plurality of weighted input signals from the first portion of a vector MM unit of the at least one vector MM unit and such that the plurality outputs provide a plurality of neuron output signals to the second portion of the vector MM unit of the at least one vector MM unit; and
  a plurality of system outputs coupled with a final neuron layer of the plurality of neuron layers, the plurality of system outputs configured to provide a plurality of output signals based on the input signals and to receive a plurality of bias signals;
  wherein the plurality of input signals corresponds to a plurality of target outputs, the plurality of bias signals is based on the plurality of target outputs and the plurality of output signals, and the plurality of weights are configured to be updated based on the plurality of bias signals, the plurality of target outputs, and the plualify of output signals.

19. The learning network of claim 18, wherein each of the plurality of neurons performs a thresholding function to provide a neuron output signal.

20. The learning network of claim 19, wherein the thresholding function includes a hysteretic thresholding function.

* * * * *